(12) United States Patent
Lee et al.

(10) Patent No.: US 12,524,103 B2
(45) Date of Patent: Jan. 13, 2026

(54) DISPLAY PANEL DISPLAY DEVICE HAVING TOUCH SENSOR STRUCTURE

(71) Applicant: LG DISPLAY CO., LTD., Seoul (KR)

(72) Inventors: TaeGyu Lee, Paju-si (KR); Jaeheon Yun, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/733,311

(22) Filed: Jun. 4, 2024

(65) Prior Publication Data

US 2025/0004590 A1    Jan. 2, 2025

(30) Foreign Application Priority Data

Jun. 28, 2023 (KR) .................. 10-2023-0083698

(51) Int. Cl.
*G06F 3/041* (2006.01)
*G06F 3/044* (2006.01)

(52) U.S. Cl.
CPC ........ *G06F 3/04164* (2019.05); *G06F 3/0412* (2013.01); *G06F 3/0446* (2019.05)

(58) Field of Classification Search
CPC .................................................. G06F 3/04164
See application file for complete search history.

(56) References Cited

U.S. PATENT DOCUMENTS

| | | | |
|---|---|---|---|
| 2018/0188867 A1* | 7/2018 | Yeh .................. | G06F 3/0443 |
| 2022/0137736 A1* | 5/2022 | Kim .................. | G06F 3/0443 |
| | | | 345/173 |
| 2024/0248571 A1* | 7/2024 | Kim .................. | G06F 3/04164 |

FOREIGN PATENT DOCUMENTS

| | | |
|---|---|---|
| CN | 206497441 U | 9/2017 |
| CN | 111599852 A | 8/2020 |
| JP | WO2012/090446 A1 | 7/2012 |
| JP | 2016-126325 A | 7/2016 |
| JP | WO2017/195451 A1 | 11/2017 |
| JP | 2019-74709 A | 5/2019 |
| JP | 2020-13578 A | 1/2020 |
| JP | 2021-131542 A | 9/2021 |
| TW | 202105151 A | 2/2021 |
| TW | 202206999 A | 2/2022 |
| WO | WO 2015/056484 A1 | 4/2015 |

OTHER PUBLICATIONS

Japanese Notice of Allowance for Japanese Application No. 2024-104302, dated Apr. 22, 2025, with English translation.

* cited by examiner

*Primary Examiner* — Chun-Nan Lin
(74) *Attorney, Agent, or Firm* — Birch, Stewart, Kolasch & Birch, LLP

(57) ABSTRACT

A display device can include a display area and a non-display area; a plurality of first sensor electrodes disposed in the display area, a plurality of second sensor electrodes disposed in the display area, a plurality of first pads disposed in the non-display area, a plurality of second pads disposed in the non-display area, a plurality of first touch routing lines electrically connecting the plurality of first sensor electrodes with the plurality of first pads, and a plurality of second touch routing lines electrically connecting the plurality of second sensor electrodes with the plurality of second pads. Also, one of the plurality of first touch routing lines electrically connected to at least one of the plurality of first sensor electrodes overlaps with at least another one of the plurality of first sensor electrodes that is electrically connected to another first touch routing line.

11 Claims, 22 Drawing Sheets

DISPLAY PANEL DISPLAY DEVICE HAVING TOUCH SENSOR STRUCTURE

CROSS-REFERENCE TO RELATED APPLICATION

This application claims priority to Korean Patent Application No. 10-2023-0083698, filed on Jun. 28, 2023, the entire contents of which are hereby expressly incorporated by reference into the present application.

BACKGROUND

Technical Field

One or more embodiments of the disclosure relate to a display device and a display panel.

Discussion of Related Art

As the information society develops, demand for display devices for displaying images is increasing in various forms. Various display devices, such as liquid crystal display devices and organic light emitting display devices, are being utilized. Among others, touch display devices provide an input scheme that allows users easier and more intuitive and convenient entry of information or commands without the need for buttons, a keyboard, a mouse, or other typical input means.

For various reasons, such as aesthetics and product application, vigorous research and development efforts are recently being conducted to reduce the size of the bezel (non-display area). However, there are significant limitations in reducing the bezel size due to inevitable placement of various components (e.g., various lines or patterns) in the bezel. There is a need for a display device with a touch sensor structure suitable for reducing the bezel size while enhancing touch sensitivity.

SUMMARY OF THE DISCLOSURE

One or more embodiments of the disclosure can provide a display device and a display panel having a touch sensor structure that allows a narrow bezel.

One or more embodiments of the disclosure can provide a display device and a display panel including a touch sensor that can provide high touch sensitivity while having a narrow bezel.

One or more embodiments of the disclosure can provide a display device and a display panel including a touch sensor that can reduce noise between sensor electrodes.

One or more embodiments of the disclosure can provide a display device and a display panel having a touch sensor stack structure suitable for reducing the bezel size and increasing touch sensitivity.

A display device according to one or more embodiments of the disclosure can comprise a substrate including a display area in which a plurality of subpixels are disposed and a non-display area including a pad area positioned in a first direction from the display area, a first sensor electrode disposed in the display area and including a plurality of first sub sensor electrodes arranged in a second direction crossing the first direction and at least one first bridge electrically connecting the plurality of first sub sensor electrodes, a first pad disposed in the pad area, and a first touch routing line electrically connecting at least one of the plurality of first sub sensor electrodes and the first pad.

The plurality of first sub sensor electrodes can be disposed in a first metal layer. The first bridge can be disposed in a second metal layer different from the first metal layer.

The first touch routing line can include a metal extending in the first direction in the display area, electrically connected to the first pad, and disposed in a third metal layer different from the first metal layer and the second metal layer.

The first touch routing line can be of a single line type or a multi-line type.

For example, when the first touch routing line is of the single line type, the first touch routing line can include a metal disposed in the third metal layer.

For example, when the first touch routing line is of the multi-line type, the first touch routing line can include a first lower sub line disposed in the third metal layer and a first upper sub line disposed in the first metal layer. Here, the first lower sub line and the first upper sub line can be electrically connected to each other.

The display device according to one or more embodiments of the disclosure can further comprise a second sensor electrode disposed in the display area and including a plurality of second sub sensor electrodes arranged in the second direction and at least one second bridge electrically connecting the plurality of second sub sensor electrodes, a second pad disposed in the pad area, and a second touch routing line electrically connecting at least one of the plurality of second sub sensor electrodes and the second pad.

The second sensor electrode can be disposed closer to the pad area than the first sensor electrode.

The plurality of second sub sensor electrodes can be disposed in the first metal layer. The second bridge can be disposed in the second metal layer.

The second touch routing line can include a metal disposed across the display area in the first direction, electrically connected to the second pad, and disposed in the third metal layer.

The first touch routing line can overlap at least one of the plurality of second sub sensor electrodes.

The display device according to one or more embodiments of the disclosure can further comprise a third sensor electrode disposed in the first direction to pass between two adjacent first sub sensor electrodes among the plurality of first sub sensor electrodes, a third pad disposed in the pad area, and a third touch routing line electrically connecting the third sensor electrode and the third pad.

The third sensor electrode can overlap the first bridge.

The third touch routing line can include a metal disposed in a different metal layer from the first touch routing line. For example, the third touch routing line can include a metal disposed in the second metal layer.

The third touch routing line can be of a single line type or a multi-line type.

For example, when the third touch routing line is of the single line type, the third touch routing line can include a metal disposed in the second metal layer.

For example, when the third touch routing line is of the multi-line type, the third touch routing line can include a third lower sub line disposed in the second metal layer and a third upper sub line disposed in the first metal layer. Here, the third lower sub line and the third upper sub line can be electrically connected to each other.

The third sensor electrode can overlap the first touch routing line.

A display panel according to one or more embodiments of the disclosure can comprise a substrate including a display area in which a plurality of subpixels are disposed and a non-display area including a pad area positioned in a first direction from the display area, a first touch interlayer insulation film on the substrate, a second touch interlayer insulation film on the first touch interlayer insulation film, a touch protective film on the second touch interlayer insulation film, a first metal layer between the second touch interlayer insulation film and the touch protective film, a second metal layer between the first touch interlayer insulation film and the second touch interlayer insulation film, a third metal layer on the substrate and the first touch interlayer insulation film, a first sensor electrode including a plurality of first sub sensor electrodes disposed in the first metal layer and a first bridge disposed in the second metal layer to electrically connect the plurality of first sub sensor electrodes, and a first touch routing line electrically connected to the first sensor electrode, including a metal disposed in the third metal layer, and extending in the first direction in the display area.

The display panel according to one or more embodiments of the disclosure can further comprise a second sensor electrode including a plurality of second sub sensor electrodes disposed in the first metal layer and a second bridge disposed in the second metal layer to electrically connect the plurality of second sub sensor electrodes, and a second touch routing line electrically connected to the second sensor electrode, including a metal disposed in the third metal layer, and extending in the first direction in the display area.

According to the internal touch routing structure, the first touch routing line can overlap the plurality of second sub sensor electrodes.

The display panel according to one or more embodiments of the disclosure can further comprise a third sensor electrode disposed in the first metal layer, a third touch routing line electrically connected to the third sensor electrode and including a metal disposed in the second metal layer different from the third metal layer, a fourth sensor electrode including a plurality of fourth sub sensor electrodes disposed in the first metal layer and a second bridge disposed in the second metal layer to electrically connect the plurality of fourth sub sensor electrodes, and a fourth touch routing line electrically connected to the fourth sensor electrode, including a metal disposed in the third metal layer, and extending in the first direction in the display area.

The first sensor electrode, the second sensor electrode, and the fourth sensor electrode can cross the third sensor electrode.

For example, the first sensor electrode, the second sensor electrode, and the fourth sensor electrode can be reception sensor electrodes, and the third sensor electrode can be a transmission sensor electrode.

As another example, the first sensor electrode, the second sensor electrode, and the fourth sensor electrode can be transmission sensor electrodes, and the third sensor electrode can be a reception sensor electrode.

The display panel according to one or more embodiments of the disclosure can further comprise a first contact hole where the first sensor electrode and the first touch routing line are connected and a second contact hole where the fourth sensor electrode and the fourth touch routing line are connected.

For example, the first contact hole and the second contact hole can be both positioned on one side of the third sensor electrode, and the first touch interlayer insulation film can include an inorganic film.

In this situation, the third touch routing line and the fourth touch routing line may not overlap.

As another example, the first contact hole can be positioned on one side of the third sensor electrode, the second contact hole can be positioned on another side of the third sensor electrode, and the first touch interlayer insulation film can include an organic film.

In this situation, the third touch routing line and the fourth touch routing line can overlap.

According to an embodiment of the disclosure, there can be provided a display device and a display panel having a touch sensor structure that allows for a narrow bezel.

According to an embodiment of the disclosure, there can be provided a display device and a display panel including a touch sensor that can provide high touch sensitivity while having a narrow bezel.

According to an embodiment of the disclosure, there can be provided a display device and a display panel including a touch sensor that can reduce noise between sensor electrodes.

According to an embodiment of the disclosure, there can be provided a display device and a display panel having a touch sensor stack structure suitable for reducing the bezel size and increasing touch sensitivity.

According to embodiments of the disclosure, as the bezel size is significantly reduced, the amount of materials used for the reduced bezel size can be reduced. This can help reduce the weight of the display device.

BRIEF DESCRIPTION OF DRAWINGS

The accompanying drawings, which are included to provide a further understanding of the disclosure and are incorporated in and constitute a part of this application, illustrate embodiments of the disclosure and together with the description serve to explain principles of the disclosure. In the drawings.

DETAILED DESCRIPTION OF THE EMBODIMENTS

Hereinafter, one or more embodiments of the disclosure are described in detail with reference to the accompanying drawings. The same or substantially the same reference denotations are used to refer to the same or substantially the same elements throughout the specification and the drawings. When determined to make the subject matter of the disclosure unclear, the detailed explanation of the relevant art or functions can be skipped. As used herein, when a component "includes," "has," or "is composed of" another component, the component can add other components unless the component "only" includes, has, or "is composed of" the other component. As used herein, the singular forms "a," "an," and "the" are intended to include the plural forms as well, unless the context clearly indicates otherwise.

Such denotations as "first," "second," "A," "B," "(a)," and "(b)" can be used in describing the components of the disclosure. These denotations are provided merely to distinguish a component from another, and the essence, order, or number of the components is not limited by the denotations in light of order or sequence.

In describing the positional relationship between components, when two or more components are described as "connected", "coupled," or "linked," the two or more components can be directly "connected," "coupled," or "linked," or another component can intervene. Here, the other component can be included in one or more of the two or more components that are "connected," "coupled," or "linked" to each other.

When such terms as, e.g., "after," "next to," and "before" are used to describe the temporal flow relationship related to components, operation methods, and fabricating methods, it can include a non-continuous relationship unless the term "immediately" or "directly" is used.

Meanwhile, if a numerical value or its corresponding information (e.g., level, etc.) is mentioned for a component, it can be interpreted that the numerical value or its corresponding information includes a margin of error that can be caused by various factors (e.g., process factors, internal or external shocks, noise, etc.) even if it is not explicitly stated otherwise.

Hereinafter, various embodiments of the disclosure are described in detail with reference to the accompanying drawings.

Figure 1:
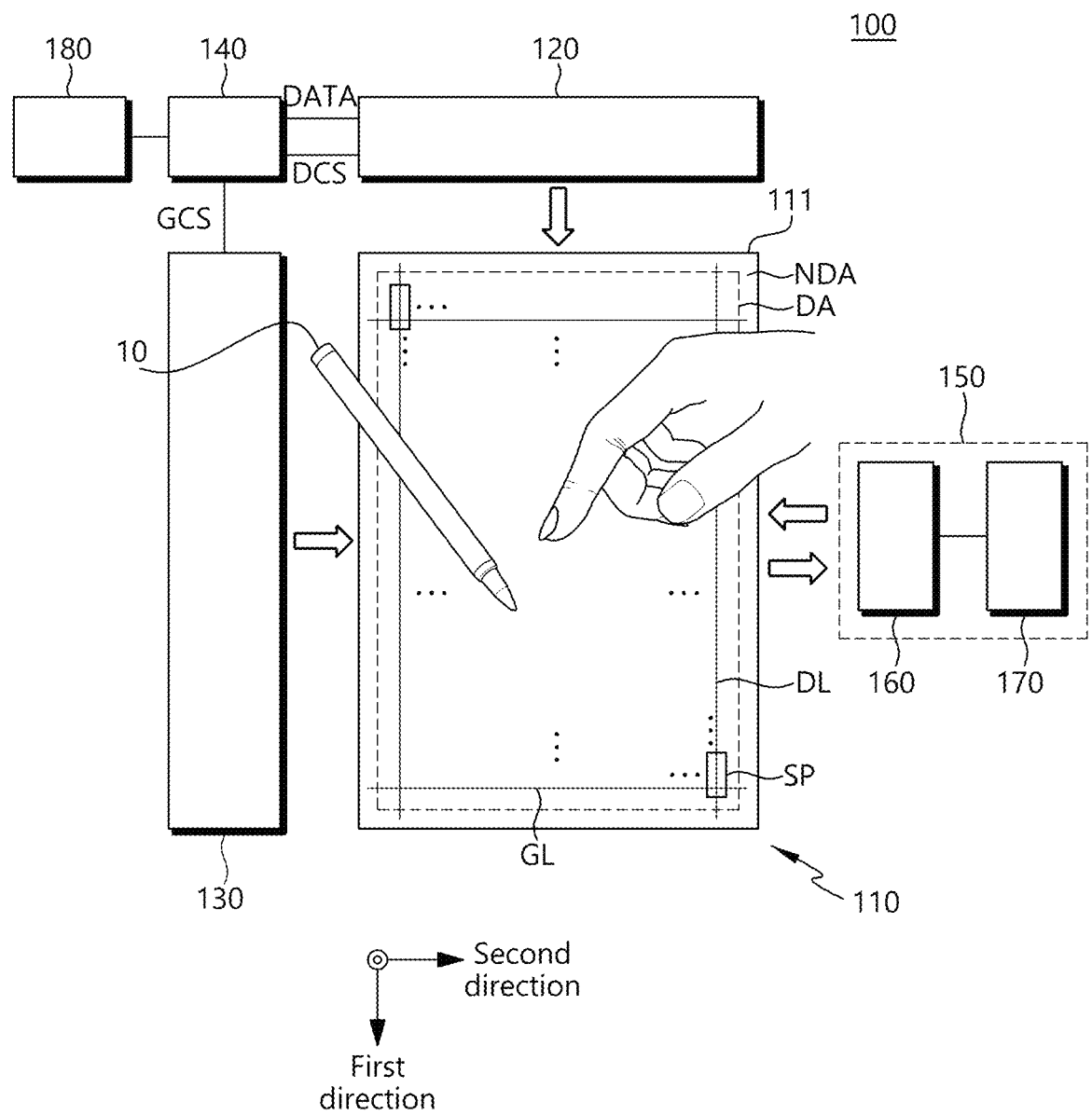
FIG. 1 is a view illustrating a system configuration of a display device according to one or more embodiments of the disclosure.

FIG. 1 is a view illustrating a system configuration of a display device 100 according to one or more embodiments of the disclosure.

Referring to FIG. 1, a display device 100 according to one or more embodiments of the disclosure can include a display panel 110 and display driving circuits, as components for displaying images. The display driving circuits are circuits for driving the display panel 110 and can include a data driving circuit 120, a gate driving circuit 130, and a display controller 140.

The display panel 110 can include a substrate 111, a plurality of subpixels SP disposed on the substrate 111, and various signal lines disposed on the substrate 111 to drive the plurality of subpixels SP.

The substrate 111 can include a display area DA where the plurality of subpixels SP are disposed and a non-display area NDA positioned in a first direction from the display area DA.

The non-display area NDA can include a pad area for connection with the data driving circuit 120. For example, the pad area can be positioned in the first direction from the display area DA. The non-display area NDA can have a size that is just large enough to include a pad area. In other words, the non-display area NDA of the display panel 110 according to one or more embodiments of the disclosure can have a very small size. For example, the non-display area NDA can be bent along the boundary line between the display area DA and the non-display area NDA, so that the non-display area NDA can be positioned under or behind the display area DA. In this situation, no or little change may be made to the non-display area NDA shown to the user when the user views the display area 100 from the front.

The display device 100 according to one or more embodiments of the disclosure can be a liquid crystal display device or a self-emission display device, in which the display panel 110 emits light by itself. When the display device 100 according to the embodiments of the disclosure is a self-emission display device, each of the plurality of subpixels SP can include a light emitting element.

For example, the display device 100 according to one or more embodiments of the disclosure can be an organic light emitting diode display in which the light emitting element is implemented with an organic light emitting diode (OLED). As another example, the display device 100 according to one or more embodiments of the disclosure can be an inorganic light emitting display device in which the light emitting element is implemented with an inorganic material-based light emitting diode. As another example, the display device 100 according to one or more embodiments of the disclosure can be a quantum dot display device in which the light emitting element is implemented with a quantum dot which is self-emission semiconductor crystal.

The structure of each of the plurality of subpixels SP can vary according to the type of the display device 100. For example, when the display device 100 is a self-emission display device in which the subpixels SP emit light by themselves, each subpixel SP can include a light emitting element that emits light by itself, one or more transistors, and one or more capacitors.

For example, various types of signal lines can include a plurality of data lines DL transferring data signals (also referred to as data voltages or image signals) and a plurality of gate lines GL transferring gate signals (also referred to as scan signals).

The plurality of data lines DL and the plurality of gate lines GL can cross each other. Each of the plurality of data lines DL can be disposed to extend in the first direction. Each of the plurality of gate lines GL can be disposed to extend in the second direction. Here, the first direction can be a column direction and the second direction can be a row direction. The first direction can be the row direction, and the second direction can be the column direction. For convenience of description, described below is an example in which each of the plurality of data lines DL is disposed in the column direction, and each of the plurality of gate lines GL is disposed in the row direction, and the first direction is the column direction, and the second direction is the row direction.

The data driving circuit 120 is a circuit for driving the plurality of data lines DL, and can output data signals to the plurality of data lines DL.

The data driving circuit 120 can receive digital image data DATA from the display controller 140, convert the received image data DATA into analog data signals, and output them to the plurality of data lines DL.

For example, the data driving circuit 120 can be connected with the display panel 110 by a tape automated bonding (TAB) method or connected to a bonding pad of the display panel 110 by a chip on glass (COG) or chip on panel (COP) method or can be implemented with a chip on film (COF) method and connected with the display panel 110.

The data driving circuit 120 can be disposed outside the display area DA of the display panel 110, but alternatively, the data driving circuit 120 can be disposed in the display area DA of the display panel 110.

The gate driving circuit 130 is a circuit for driving the plurality of gate lines GL, and can output gate signals to the plurality of gate lines GL.

The gate driving circuit 130 can receive a first gate voltage corresponding to a turn-on level voltage and a second gate voltage corresponding to a turn-off level voltage, along with various gate driving control signals GCS, generate gate signals, and supply the generated gate signals to the plurality of gate lines GL.

In the display device 100 according to one or more embodiments of the disclosure, the gate driving circuit 130 can be disposed to overlap with the display area DA of the display panel 110. For example, the gate driving circuit 130 can be disposed throughout the display area DA or can be disposed only in a portion (e.g., two opposite sides) of the display area DA. When the gate driving circuit 130 is disposed to overlap with the display area DA, the gate driving circuit 130 can be disposed not to overlap with any of the subpixels SP or can be disposed to overlap with all or some of the subpixels SP.

In the display device 100 according to one or more embodiments of the disclosure, the gate driving circuit 130 can be embedded, in a gate in panel (GIP) type, in the display panel 110. When the gate driving circuit 130 is of the gate in panel type, the gate driving circuit 130 can be formed on the substrate 111 of the display panel 110 during the display panel 110 manufacturing process.

The display controller 140 is a device for controlling the data driving circuit 120 and the gate driving circuit 130, and the display controller 140 can control driving timings for the plurality of data lines DL and driving timings for the plurality of gate lines GL.

The display controller 140 can supply a data driving control signal DCS to the data driving circuit 120 to control data driving and can supply a gate driving control signal GCS to the gate driving circuit 130 to control gate driving.

The display controller 140 can receive input image data from the host system 180 and supply image data DATA to the data driving circuit 120 based on the input image data.

The display controller 140 can be implemented as a separate component from the data driving circuit 120, or the display controller 140 and the data driving circuit 120 can be integrated into a single integrated circuit (IC).

The display controller 140 can be a timing controller used in typical display technology, a control device that can perform other control functions as well as the functions of the timing controller, or a control device other than the timing controller, or a circuit in the control device. The display controller 140 can be implemented as various circuits or electronic components, such as an integrated circuit (IC), a field programmable gate array (FPGA), an application specific integrated circuit (ASIC), or a processor.

The display controller 140 can be mounted on a printed circuit board or a flexible printed circuit and can be electrically connected with the data driving circuit 120 and the gate driving circuit 130 through the printed circuit board or the flexible printed circuit.

The display controller 140 can transmit/receive signals to/from the data driving circuit 120 according to one or more predetermined interfaces. The interface can include, e.g., a low voltage differential signaling (LVDS) interface, an embedded clock point-point interface (EPI), and a serial peripheral interface (SPI).

Meanwhile, the display device 100 according to one or more embodiments of the disclosure can include a touch sensor and a touch sensing circuit 150 to further provide a touch sensing function as well as an image display function.

The touch sensing circuit 150 can detect the presence of a touch (finger touch or pen touch) by a touch object, such as a finger or pen 10, or touch position by sensing the touch sensor.

For example, the touch sensing circuit 150 can include a touch driving circuit 160 that drives and senses the touch sensor and generates and outputs touch sensing data and a touch controller 170 that can detect an occurrence of a touch or the position of the touch using touch sensing data.

The touch sensor can include a plurality of sensor electrodes. Here, the touch sensor can also be referred to as a touch panel or a touchscreen panel (TSP).

The touch sensor can be of an external type in which it is present outside the display panel 110 or of an internal type in which it is present inside the display panel 110.

When the touch sensor is of the external type, the touch sensor and the display panel 110 can be separately manufactured and combined during an assembly process. The external-type touch sensor can include a substrate and a plurality of sensor electrodes on the substrate.

When the touch sensor is of the internal type, a plurality of sensor electrodes can be formed, together with various patterns for display driving, in the display panel 110 during the manufacturing process of the display panel 110.

The touch driving circuit 160 can supply a touch driving signal to at least one of the plurality of sensor electrodes and can sense at least one of the plurality of sensor electrodes to generate touch sensing data.

The touch sensing circuit 150 can perform touch sensing in a self-capacitance sensing scheme or a mutual-capacitance sensing scheme.

When the touch sensing circuit 150 performs touch sensing in the self-capacitance sensing scheme, the touch sensing circuit 150 can perform touch sensing based on capacitance between each sensor electrode and the touch object (e.g., finger or pen 10). According to the self-capacitance sensing scheme, each of the plurality of sensor electrodes can serve both as a transmission sensor electrode and as a reception sensor electrode. The touch driving circuit 160 can drive all or some of the plurality of sensor electrodes and sense all or some of the plurality of sensor electrodes.

When the touch sensing circuit 150 performs touch sensing in the mutual-capacitance sensing scheme, the touch sensing circuit 150 can perform touch sensing based on capacitance between the plurality of sensor electrodes. According to the mutual-capacitance sensing scheme, the plurality of sensor electrodes can be divided into a plurality of transmission sensor electrodes and the plurality of reception sensor electrodes. The touch driving circuit 160 can drive the plurality of transmission sensor electrodes and the plurality of reception sensor electrodes.

Hereinafter, the transmission sensor electrode is also referred to as a driving sensor electrode, and the reception sensor electrode is also referred to as a detecting sensor electrode.

The touch driving circuit 160 and the touch controller 170 included in the touch sensing circuit 150 can be implemented as separate devices or as a single device.

The touch driving circuit 160 and the data driving circuit 120 can be implemented as separate devices or as a single device. For example, the touch driving circuit 160 and the data driving circuit 120 can be configured as a single integrated circuit.

The display device 100 can further include a power supply circuit for supplying various types of power to the display driver integrated circuit and/or the touch sensing circuit 150.

The display device 100 according to one or more embodiments of the disclosure can be a mobile terminal, such as a smart phone or a tablet, or a monitor or television (TV) in various sizes but, without limited thereto, can be a display in various types and various sizes capable of displaying information or images.

Figure 2A:
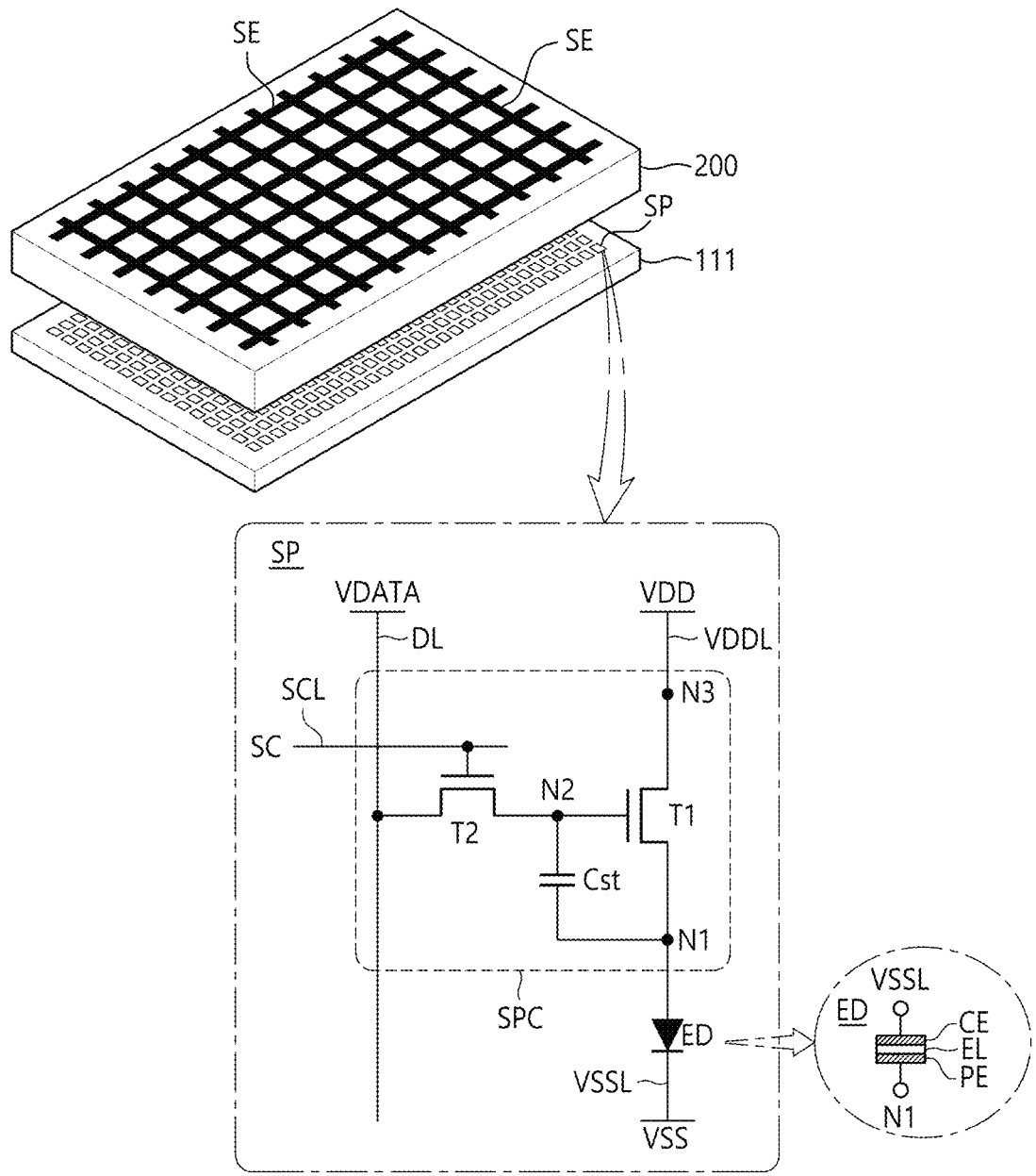
FIG. 2A illustrates a display panel according to embodiments of the disclosure.

FIG. 2A illustrates a display panel 110 according to an embodiment of the disclosure.

Referring to FIG. 2A, the display panel 110 can include a substrate 111 on which a plurality of subpixels SP are disposed and an encapsulation layer 200 on the substrate 111. Here, the encapsulation layer 200 can also be referred to as an encapsulation substrate or an encapsulation portion.

Referring to FIG. 2A, when the display device 100 according to one or more embodiments of the disclosure is a self-luminous display device, each of the plurality of subpixels SP can include a light emitting element ED and a subpixel circuit unit SPC for driving the light emitting element ED.

Referring to FIG. 2A, the subpixel circuit unit SPC can include a plurality of pixel driving transistors for driving the light emitting element ED and at least one capacitor.

The plurality of pixel driving transistors can include a first transistor T1, which is a driving transistor for driving the light emitting element ED, and a second transistor T2 for transferring the data signal VDATA to the second node N2 of the first transistor T1.

The at least one capacitor can include a storage capacitor Cst for maintaining a constant voltage during a frame.

To drive the subpixel SP, a data signal VDATA as an image signal and a scan signal SC as a gate signal can be applied to the subpixel SP. Further, for driving the subpixel SP, a common pixel driving voltage including the first driving voltage VDD and the second driving voltage VSS can be applied to the subpixel SP.

The light emitting element ED can include a pixel electrode PE, an element intermediate layer EL, and a common electrode CE. The pixel electrode PE can be an electrode disposed in each subpixel SP, and the common electrode CE can be an electrode commonly disposed in all the subpixels SP. The element intermediate layer EL can be a layer disposed between the pixel electrode PE and the common electrode CE, and can include an emission layer (EML).

When the light emitting element ED is an organic light emitting element, the element intermediate layer EL can include an emission layer (EML), a first common layer between the anode and the emission layer, and a second common layer between the emission layer and the cathode. The emission layer can be disposed for each subpixel SP, and the first and second common layers can be commonly disposed in the plurality of subpixels SP. Here, the anode can be the pixel electrode PE or the common electrode CE, and the cathode can be the common electrode CE or the pixel electrode PE.

For example, the common electrode CE can be electrically connected to the second driving voltage line VSSL. The second driving voltage VSS, which is one type of the common pixel driving voltage, can be applied to the common electrode CE through the second driving voltage line VSSL. The pixel electrode PE can be electrically connected to the first node N1 of the first transistor T1 of each subpixel SP.

For example, the pixel electrode PE can be an anode, and the common electrode CE can be a cathode. Conversely, the pixel electrode PE can be a cathode, and the common electrode CE can be an anode. For convenience of description, it is assumed below that the pixel electrode PE is an anode, and the common electrode CE is a cathode.

Each of the light emitting elements ED can include portions in which the pixel electrode PE, the element intermediate layer EL, and the common electrode CE overlap each other. A predetermined light emitting area can be formed by each light emitting element ED. For example, the light emitting area of each light emitting element ED can include an area in which the pixel electrode PE, the element intermediate layer EL, and the common electrode CE overlap.

According to an embodiment, the light emitting element ED can be an inorganic light emitting diode (LED), a quantum dot light emitting element, or the like.

The first transistor T1 can be a driving transistor for supplying a driving current to the light emitting element ED. The first transistor T1 can be connected between the first driving voltage line VDDL and the light emitting element ED.

The first transistor T1 can include a first node N1 electrically connected to the light emitting element ED, a second node N2 to which the data signal VDATA can be applied, and a third node N3 to which the driving voltage VDD is applied from the first driving voltage line VDDL.

In the first transistor T1, the second node N2 can be a gate node, the first node N1 can be a source node or a drain node, and the third node N3 can be the drain node or the source node. Hereinafter, for convenience of description, in the first transistor T1, the second node N2 can be the gate node, the first node N1 can be the source node, and the third node N3 can be the drain node.

The second transistor T2 can be a switching transistor for transferring a data signal VDATA, which is an image signal, to the second node N2, which is the gate node of the first transistor T1, which is a driving transistor.

The second transistor T2 can be controlled to be turned on and off by the scan signal SC, which is a gate signal applied through the scan line SCL, which is a type of the gate line GL, to control electrical connection between the second node N2 of the first transistor T1 and the data line DL. The drain electrode or the source electrode of the second transistor T2 can be electrically connected to the data line DL, the source electrode or the drain electrode of the second transistor T2 can be electrically connected to the second node N2 of the first transistor T1, and the gate electrode of the second transistor T2 can be electrically connected to the scan line SCL.

The storage capacitor Cst can be electrically connected between the first node N1 and the second node N2 of the first transistor T1. The storage capacitor Cst can include a first capacitor electrode electrically connected to the first node N1 of the first transistor T1 or corresponding to the first node N1 of the first transistor T1, and a second capacitor electrode electrically connected to the second node N2 of the first transistor T1 or corresponding to the second node N2 of the first transistor T1.

Each of the first transistor T1 and the second transistor T2 can be an n-type transistor or a p-type transistor.

At least a portion of the subpixel circuit unit SPC can overlap with at least a portion of the light emitting element ED in a vertical direction. Alternatively, the subpixel circuit unit SPC may not overlap with the light emitting element ED in the vertical direction.

As illustrated in FIG. 2A, the subpixel circuit unit SPC can have a 2T (Transistor) 1C (Capacitor) structure including two transistors T1 and T2 and one capacitor Cst. In some cases, the subpixel circuit unit SPC can further include one or more transistors or can further include one or more capacitors.

According to the structure of the subpixel circuit unit SPC, the type and number of gate signals supplied to the subpixel SP and gate lines can vary. Further, the type and the number of common pixel driving voltages supplied to the subpixel SP can vary according to the structure of the subpixel circuit unit SPC.

Since the circuit elements (especially the light emitting element ED implemented as the organic light emitting diode (OLED) including an organic material) in each subpixel SP are vulnerable to external moisture or oxygen, the encapsulation layer 200 for preventing external moisture or oxygen from penetrating into the circuit elements (especially the light emitting element ED) can be disposed on the display panel 110. The encapsulation layer 200 can be configured in various forms so that the light emitting elements ED are not exposed to moisture or oxygen.

Referring to FIG. 2A, the display panel 110 according to one or more embodiments of the disclosure can include a plurality of sensor electrodes SE for touch sensing. For example, a plurality of sensor electrodes SE can be disposed on the encapsulation layer 200.

The display panel 110 according to one or more embodiments of the disclosure can further include a plurality of signal lines (hereinafter, referred to as a plurality of touch routing lines) for electrically connecting the plurality of sensor electrodes SE to the touch driving circuit 160.

The display device 100 according to an embodiment of the disclosure can have an extremely narrow bezel structure in which the non-display area NDA of the display panel 110 is very small or almost absent. Hereinafter, an extremely narrow bezel structure of the display panel 110 of the display device 100 according to an embodiment of the disclosure is described.

The display panel 110 according to one or more embodiments of the disclosure has an internal touch routing structure as an extremely narrow bezel structure. The internal touch routing structure of the display panel 110 according to one or more embodiments of the disclosure can be a structure in which a touch routing line for electrical connection between the sensor electrode SE and the touch driving circuit 160 is disposed across the display area DA without passing the non-display area NDA outside the display area DA. Hereinafter, an internal touch routing structure of the display panel 110 according to one or more embodiments of the disclosure is described in more detail.

Figure 2B:
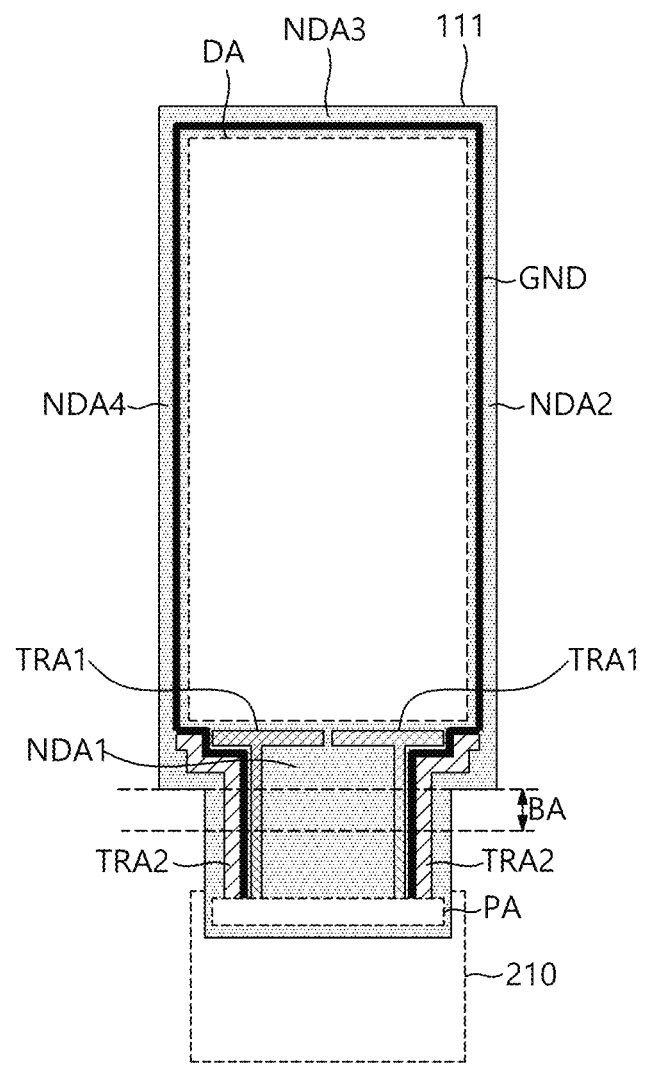
FIG. 2B illustrates a substrate of a display panel according to one or more embodiments of the disclosure.

FIG. 2B illustrates a substrate 111 of a display panel 110 according to one or more embodiments of the disclosure.

Referring to FIG. 2B, the substrate 111 of the display panel 110 according to one or more embodiments of the disclosure can include a display area DA in which an image can be displayed and a non-display area NDA in which an image is not displayed.

Referring to FIG. 2B, the non-display area NDA can include a first non-display area NDA1 positioned in or arranged along the first direction from the display area DA, a second non-display area NDA2 positioned in or arranged along the second direction from the display area DA, a third non-display area NDA3 positioned in or arranged along a direction opposite to the first direction from the display area DA, and a fourth non-display area NDA4 positioned in or arranged along a direction opposite to the second direction from the display area DA. For example, the first direction can be a column direction (Y-axis direction), and the second direction crossing the first direction can be a row direction (X-axis direction). In other words, the first non-display area NDA1 can be adjacent to a first side of the display area DA, the second non-display area NDA2 can be adjacent to a second side of the display area DA, the third non-display area NDA3 can be adjacent to a third side of the display area DA that is opposite to the first side, and the fourth non-display area NDA4 can be adjacent to a fourth side of the display area DA that is opposite to the second side.

Referring to FIG. 2B, the first non-display area NDA1 can include a pad area PA in which a plurality of pads are disposed. A driving circuit can be electrically connected to a plurality of pads, or a circuit film or a printed circuit board 210 on which the driving circuit mounted can be electrically connected to the plurality of pads. For example, the driving circuit can include a touch driving circuit 160. The driving circuit can further include the data driving circuit 120.

Referring to FIG. 2B, the first non-display area NDA1 can further include a bending area BA. In this situation, the substrate 111 can be a flexible substrate. In some situations, the bending area BA can be absent from the first non-display area NDA1.

For example, when the display device 100 is a mobile device (small display device) such as a smartphone, a tablet, or the like, the first non-display area NDA1 can further include a bending area BA. As another example, when the display device 100 is a medium or large display device such as a television (TV), a monitor, or the like, the bending area BA can be absent from the first non-display area NDA1.

Referring to FIG. 2B, the display panel 110 can further include a ground line GND disposed in the non-display area NDA of the substrate 111.

The ground line GND can be disposed from one point of the pad area PA to another point of the pad area PA via the second non-display area NDA2, the third non-display area NDA3, and the fourth non-display area NDA4. For example, the ground line GND can surround at least three sides of the display area DA.

Meanwhile, the display panel 110 according to the embodiments of the disclosure can further include a plurality of touch routing lines for electrically connecting the plurality of sensor electrodes SE disposed in the display area DA and the plurality of pads disposed in the pad area PA.

Referring to FIG. 2B, the first non-display area NDA1 of the substrate 111 can include a first touch routing area TRA1 and a second touch routing area TRA2.

Referring to FIG. 2B, the first touch routing area TRA1 can be an area in which a plurality of sensor electrodes SE are extending and disposed in the first direction and a plurality of touch routing lines for electrically connecting the plurality of pads are disposed.

Referring to FIG. 2B, the second touch routing area TRA2 can be an area in which a plurality of sensor electrodes SE are extending and disposed in the second direction and a plurality of touch routing lines for electrically connecting the plurality of pads are disposed.

Referring to FIG. 2B, the second non-display area NDA2 and the fourth non-display area NDA4 of the substrate 111 may not include a touch routing area in which touch routing lines are disposed. Accordingly, the size of the second non-display area NDA2 and the fourth non-display area NDA4 of the substrate 111 can be considerably reduced.

Referring to FIG. 2B, the third non-display area NDA3 of the substrate 111 may not include the pad area PA. In this situation, the third non-display area NDA3 of the substrate 111 does not include a touch routing area in which touch routing lines are disposed.

Alternatively, not only the first non-display area NDA1 but also the third non-display area NDA3 of the substrate 111 can include the pad area PA. In this situation, the third non-display area NDA3 of the substrate 111 can also include a touch routing area.

Figure 3:
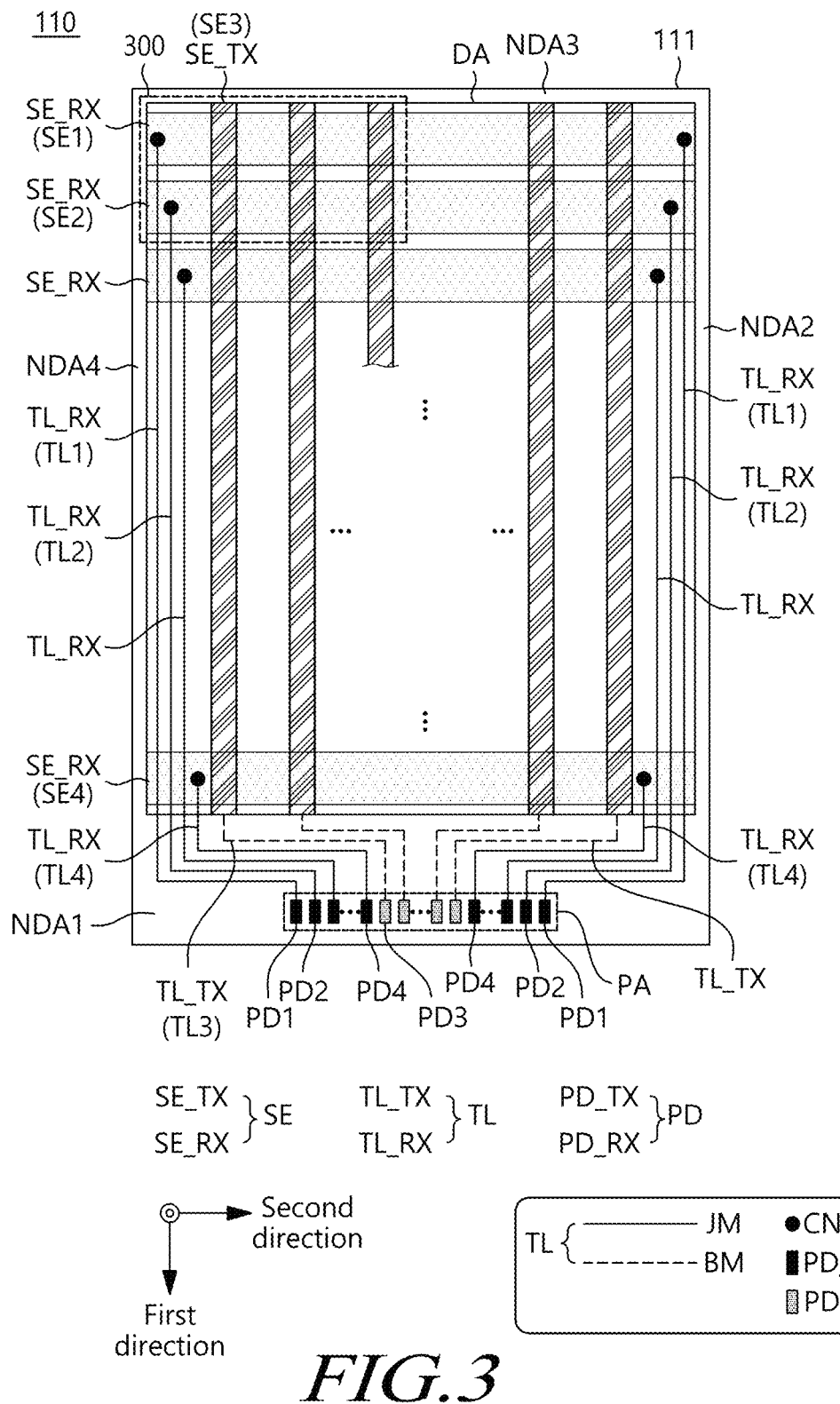
FIGS. 3, 4, 5, 6, and 7 are plan views illustrating a touch sensor included in a display panel according to one or more embodiments of the disclosure.

FIG. 3 is a plan view illustrating a touch sensor included in a display panel 110 according to one or more embodiments of the disclosure.

Referring to FIG. 3, the display panel 110 according to one or more embodiments of the disclosure can include a touch sensor including a plurality of sensor electrodes SE disposed in the display area DA.

Referring to FIG. 3, the display panel 110 according to one or more embodiments of the disclosure can further include a plurality of pads PD disposed in the pad area PA, and a plurality of touch routing lines TL for electrically connecting the plurality of sensor electrodes SE and the plurality of pads PD. The plurality of touch routing lines TL can be viewed as the components included in the touch sensor.

Referring to FIG. 3, the plurality of sensor electrodes SE can include a plurality of transmission sensor electrodes SE_TX and a plurality of reception sensor electrodes SE_RX. The plurality of touch routing lines TL can include a plurality of transmission touch routing lines TL_TX and a plurality of reception touch routing lines TL_RX. The plurality of pads PD can include a plurality of transmission pads PD_TX and a plurality of reception pads PD_RX.

A touch driving signal output from the touch driving circuit 160 can be applied to at least one of the plurality of transmission sensor electrodes SE_TX. Here, the touch driving signal can be a signal whose voltage level is changed. For example, the touch driving signal can be a pulse signal having a predetermined frequency and amplitude and can be a signal having various signal waveforms such as a triangular wave, a spherical wave, or a sine wave.

Referring to FIG. 3, the plurality of transmission sensor electrodes SE_TX and the plurality of reception sensor electrodes SE_RX can be disposed to cross each other. For example, each of the plurality of transmission sensor electrodes SE_TX can be disposed to extend in the first direction. Each of the plurality of reception sensor electrodes SE_RX can be disposed to extend in the second direction different from the first direction.

The shape of each of the plurality of transmission sensor electrodes SE_TX and the plurality of reception sensor electrodes SE_RX can be variously modified. For example, each of the plurality of transmission sensor electrodes SE_TX and the plurality of reception sensor electrodes SE_RX can have a bar shape. As another example, each of the plurality of reception sensor electrodes SE_RX can be composed of several electrically connected sub sensor electrodes, or each of the plurality of transmission sensor electrodes SE_TX can be composed of several electrically connected sub sensor electrodes. For example, each of several sub sensor electrodes can have various shapes such as a square, a rhombus, or a comb pattern.

Referring to FIG. 3, when the internal touch routing structure of the display panel 110 according to one or more embodiments of the disclosure is applied, the plurality of transmission touch routing lines TL_TX or the plurality of reception touch routing lines TL_RX can extend from the display area DA to the pad area PA included in the first non-display area NDA1 across the display area DA without passing through the second non-display area NDA2 in the second direction positioned outside the display area DA and the fourth non-display area NDA4 in the direction opposite to the second direction positioned outside the display area DA.

For example, among the plurality of transmission touch routing lines TL_TX and the plurality of reception touch routing lines TL_RX, the plurality of reception touch routing lines TL_RX can extend from the display area DA to the pad area PA included in the first non-display area NDA1 across the display area DA in the first direction without passing through the second non-display area NDA2 and the fourth non-display area NDA4 positioned outside in the second direction and the opposite direction. When the plurality of reception touch routing lines TL_RX cross the display area DA, the plurality of reception touch routing lines TL_RX can be disposed to avoid the light emitting area of each of the plurality of subpixels SP in the display area DA. Accordingly, it is possible to design an internal trace structure without deteriorating light emitting performance. In other words, the plurality of reception touch routing lines TL_RX can overlap with portions of the display area DA and extend through just one non-display area at one side (e.g., the first non-display area NDA1) in order to reach the pads.

In this situation, the plurality of reception touch routing lines TL_RX can cross the plurality of reception sensor electrodes SE_RX. In other words, the plurality of reception touch routing lines TL_RX can be positioned in a metal layer different from the plurality of reception sensor electrodes SE_RX and can overlap with the plurality of reception sensor electrodes SE_RX.

According to the internal touch routing structure of the display panel 110 according to the above-described one or more embodiments of the disclosure, the size of the non-display area NDA can be significantly reduced, since the routing lines can be disposed at one side of the display area (e.g., the first non-display area NDA1).

Referring to FIG. 3, when the internal touch routing structure of the display panel 110 according to one or more embodiments of the disclosure is applied, a plurality of touch routing lines TL can be disposed in the first non-display area NDA1 including the pad area PA among the first to fourth non-display areas NDA1 to NDA4, but a plurality of touch routing lines TL may be absent in the second non-display area NDA2 and the fourth non-display area NDA4. For example, a first trace line TL1 connecting the first sensor electrode SE1 to a first pad PD1, a second trace line TL2 connecting the second sensor electrode SE2 to a second pad PD2, and a fourth trace line TL4 connecting the fourth sensor electrode SE4 to a fourth pad PD4 can extend to the pad area without passing through the second non-display area NDA2 and the fourth non-display area NDA4.

Accordingly, the sizes of the second non-display area NDA2 and the fourth non-display area NDA4 among the first to fourth non-display areas NDA1 to NDA4 can be reduced.

Figure 8:
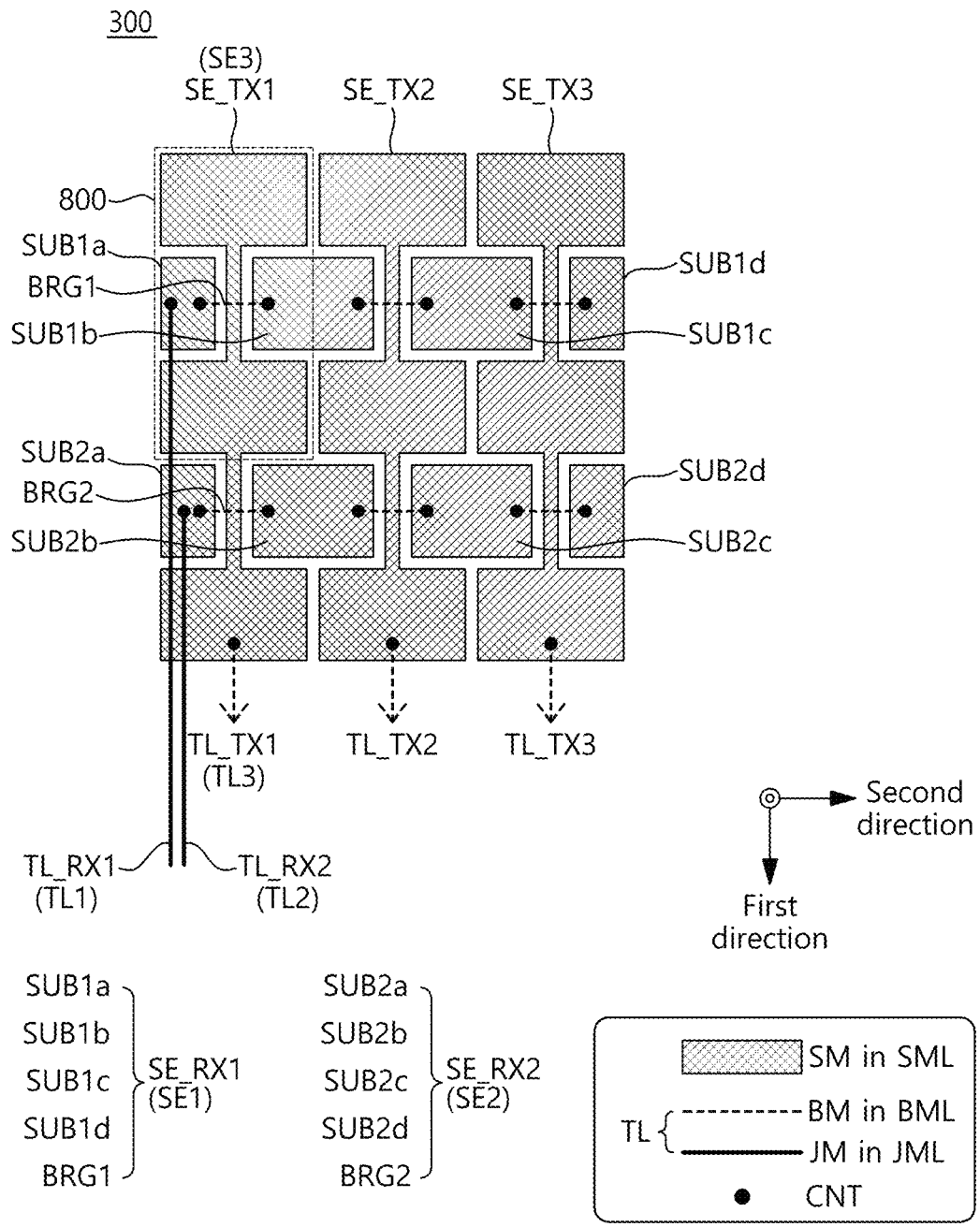
FIG. 8 illustrates, in detail, a partial area of a touch sensor included in a display panel according to one or more embodiments of the disclosure.
Figure 9:
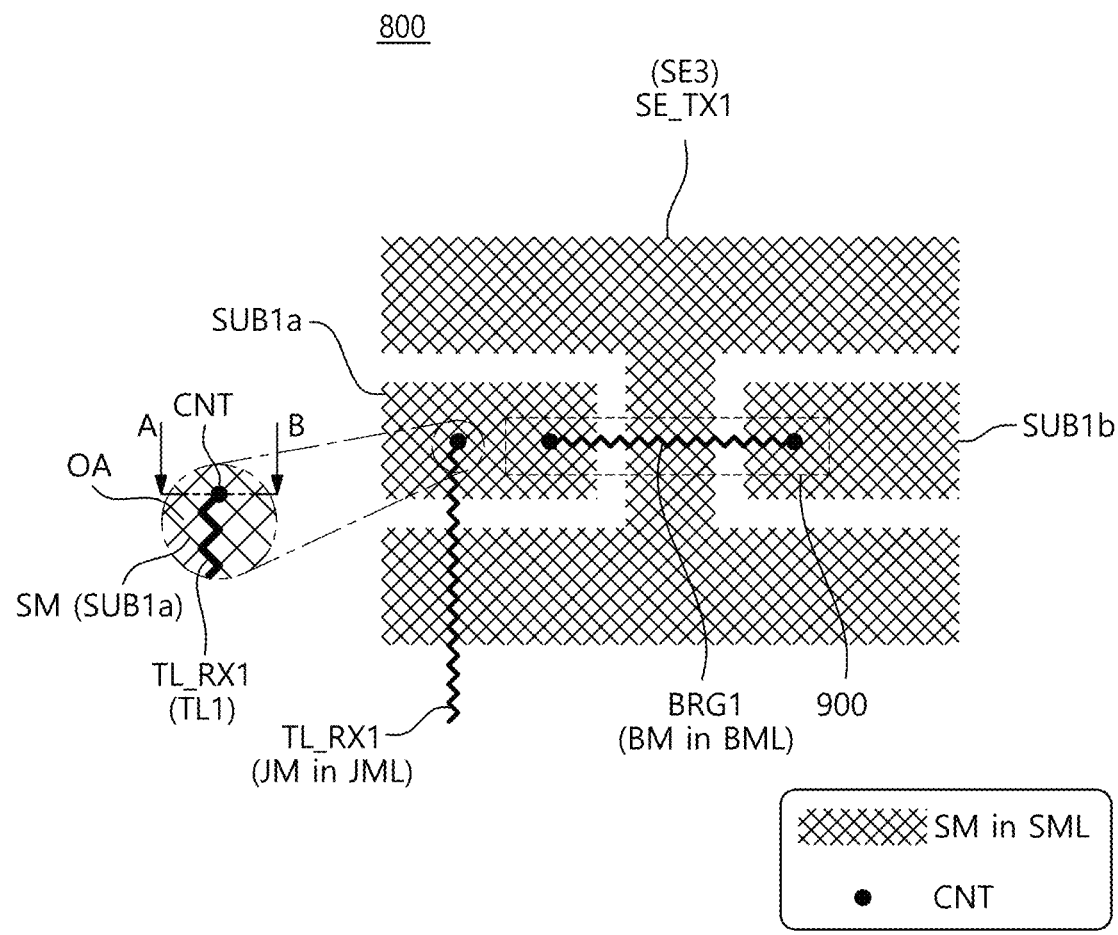
FIG. 9 illustrates a unit sensor in a touch sensor included in a display panel according to one or more embodiments of the disclosure.

Referring to FIG. 3, the sensor electrodes SE including the plurality of transmission sensor electrodes SE_TX and the plurality of reception sensor electrodes SE_RX can include a sensor metal (SM of FIGS. 8 and 9). The plurality of transmission touch routing lines TL_TX or the plurality of reception touch routing lines TL_RX can cross the plurality of transmission sensor electrodes SE_TX or the plurality of reception sensor electrodes SE_RX. The plurality of transmission touch routing lines TL_TX or the plurality of reception touch routing lines TL_RX can include a bridge metal BM different from the sensor metal included in the plurality of transmission sensor electrodes SE_TX or the plurality of reception sensor electrodes SE_RX.

For example, as illustrated in FIG. 3, among the plurality of transmission touch routing lines TL_TX and the plurality of reception touch routing lines TL_RX, the plurality of reception touch routing lines TL_RX can traverse the display area DA when crossing the plurality of reception sensor electrodes SE_RX. In this situation, the plurality of transmission touch routing lines TL_TX can include a bridge metal BM or a sensor metal, and the plurality of reception touch routing lines TL_RX can include a jumping metal JM.

As another example, among the plurality of transmission touch routing lines TL_TX and the plurality of reception touch routing lines TL_RX, the plurality of transmission touch routing lines TL_TX can traverse the plurality of transmission sensor electrodes SE_TX while crossing the display area DA. In this situation, the plurality of reception touch routing lines TL_RX can include a bridge metal BM or a sensor metal, and the plurality of transmission touch routing lines TL_TX can include a jumping metal JM.

Meanwhile, outside the display area DA (i.e., in the first non-display area NDA1), the touch routing lines TL can be changed from the sensor metal to the bridge metal BM or from the bridge metal BM to the sensor metal. If necessary, a third metal different from the sensor metal and the bridge metal BM can be utilized as a metal of the touch routing lines TL.

Hereinafter, modified examples of the touch sensor of FIG. 3 are described with reference to FIGS. 4, 5, 6, and 7. However, in describing the touch sensor of FIGS. 4, 5, 6, and 7, descriptions of the same features as those of the touch sensor of FIG. 3 will be omitted, and different features will be mainly described.

Figure 4:
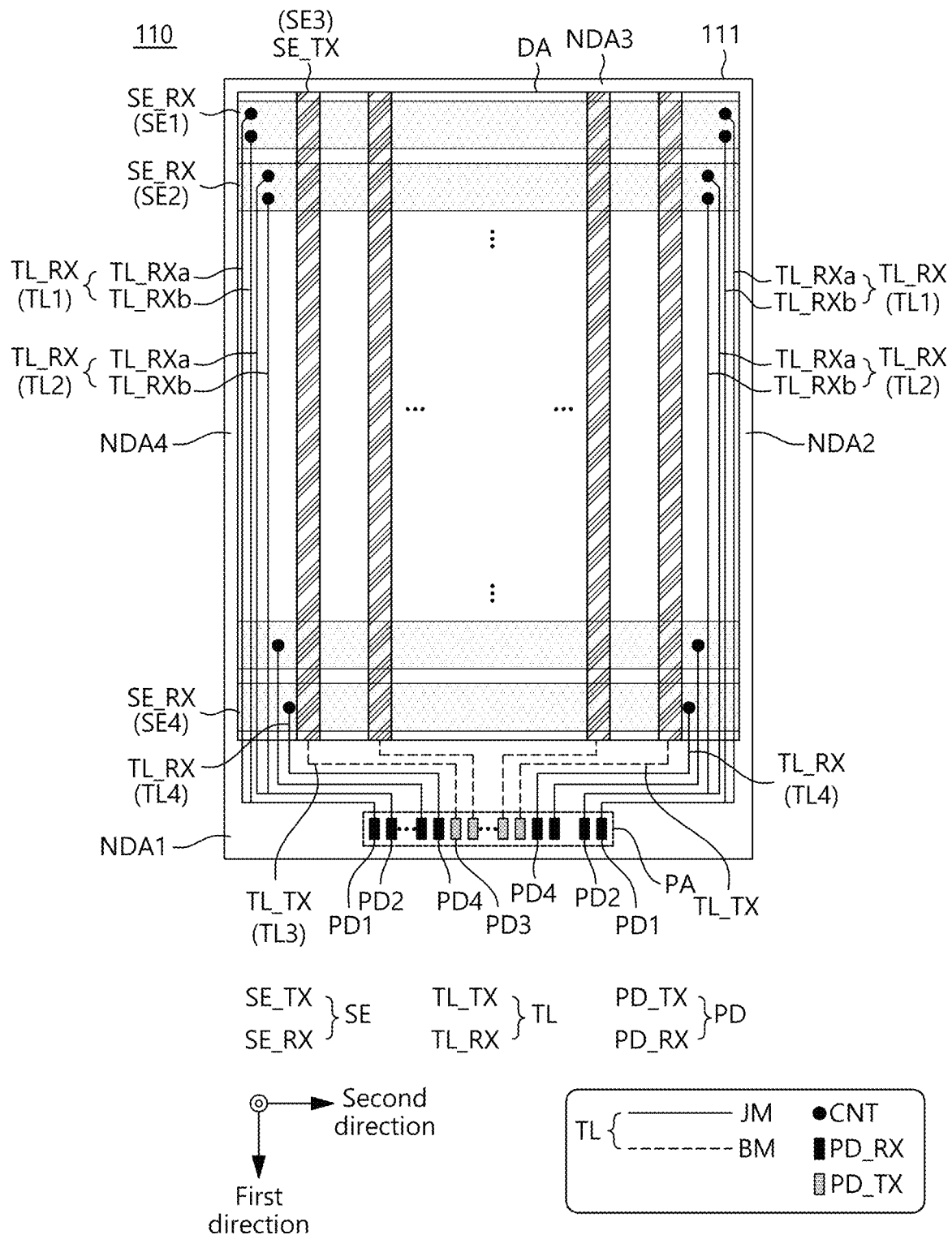

FIG. 4 is another plan view illustrating a touch sensor included in a display panel 110 according to one or more embodiments of the disclosure.

Referring to FIG. 4, the touch sensor included in the display panel 110 according to one or more embodiments of the disclosure can have a resistance-equivalent design structure.

The number of reception touch routing lines TL_RX connected to one reception sensor electrode SE_RX farthest from the pad area PA among the plurality of reception sensor electrodes SE_RX can be larger than the number of reception touch routing lines TL_RX connected to one reception sensor electrode SE_RX closest to the pad area PA among the plurality of reception sensor electrodes SE_RX, in order to reduce the resistance.

For example, as illustrated in FIG. 4, two reception touch routing lines TL_RXa and TL_RXb can be connected to each of two opposite ends of one reception sensor electrode SE_RX farthest from the pad area PA among the plurality of reception sensor electrodes SE_RX, and one reception touch routing line TL_RX can be connected to each of two opposite ends of one reception sensor electrode SE_RX closest to the pad area PA among the plurality of reception sensor electrodes SE_RX.

Referring to FIG. 4, the first trace line TL1 connected to one end of the first sensor electrode SE1, which is the farthest one reception sensor electrode SE_RX, can include two reception trace lines TL_RXa and TL_RXb overlapping the display area DA and extending in the first direction. Similarly, the first trace line TL1 connected to the other end of the first sensor electrode SE1 can include two reception trace lines TL_RXa and TL_RXb overlapping the display area DA and extending in the first direction. The two reception trace lines TL_RXa and TL_RXb included in the first trace line TL1 connected to one end of the first sensor electrode SE1 can be physically connected in the non-display area NDA. The two reception trace lines TL_RXa and TL_RXb included in the first trace line TL1 connected to the other end of the first sensor electrode SE1 can be physically connected in the non-display area NDA.

As such, the two reception trace lines TL_RXa and TL_RXb can be physically connected (i.e., merged into one) in the non-display area NDA to be connected to one first pad PD1. Accordingly, the number of pads in the pad area PA can be reduced, and the number of pads (the number of channels) of the touch driving circuit 160 can be reduced.

For example, when the plurality of reception sensor electrodes SE_RX are divided into n groups, the number of reception touch routing lines TL_RX connected to the reception sensor electrode SE_RX included in the first group closest to the pad area PA among the n groups can be 1, the number of reception touch routing lines TL_RX connected to the reception sensor electrode SE_RX included in the second group second closest to the pad area PA among the n groups can be 2, the number of reception touch routing lines TL_RX connected to the reception sensor electrode SE_RX included in the third group third closest to the pad area PA among the n groups can be 3, and the number of reception touch routing lines TL_RX connected to the reception sensor electrode SE_RX included in the nth group nth closest to the pad area PA among the n groups can be n. In other words, the reception sensor electrodes SE_RX that are located farther away from the pad area PA can have more reception touch routing lines TL_RX connected to them, so that the resistance can be reduced (e.g., the resistance from the pads to each of the corresponding reception sensor electrodes can be made to be the same or at least substantially the same).

According to the resistance-equivalent design structure of the touch sensor included in the display panel 110 according to one or more embodiments of the disclosure, even though there is a length deviation between the plurality of reception touch routing lines TL_RX, the resistance deviation of the signal transmission path between the plurality of reception sensor electrodes SE_RX and the plurality of reception pads PD_RX can be reduced. Thus, touch sensitivity can be enhanced and made more uniform even across a large touch screen.

Meanwhile, referring to FIGS. 3 and 4, in the touch sensor included in the display panel 110 according to one or more embodiments of the disclosure, all of the plurality of contact holes CNTs where the plurality of reception sensor electrodes SE_RX and the plurality of reception touch routing lines TL_RX are connected can be positioned farther out from the outermost transmission touch routing line TL_TX among the plurality of transmission touch routing lines TL_TX.

In other words, referring to FIGS. 3 and 4, the first touch routing line TL1, the second touch routing line TL2, and the fourth trace line TL4 can be disposed to extend in the first direction from a border area in the display area DA. Here, the border area is a partial area included in the display area DA, and can be a partial area positioned farther out from the sensor electrode SE4 disposed at the outermost side among the sensor electrodes SE_TX extending in the first direction. In the examples of FIGS. 3 and 4, the border area can include a first border area positioned farther out from the sensor electrode SE3 disposed at the outermost side in the left direction (a direction opposite to the second direction) among the sensor electrodes SE_TX extending in the first direction, and a second border area positioned farther out from the sensor electrode disposed at the outermost side in the right direction (the second direction) among the sensor electrodes SE_TX extending in the first direction.

Figure 5:
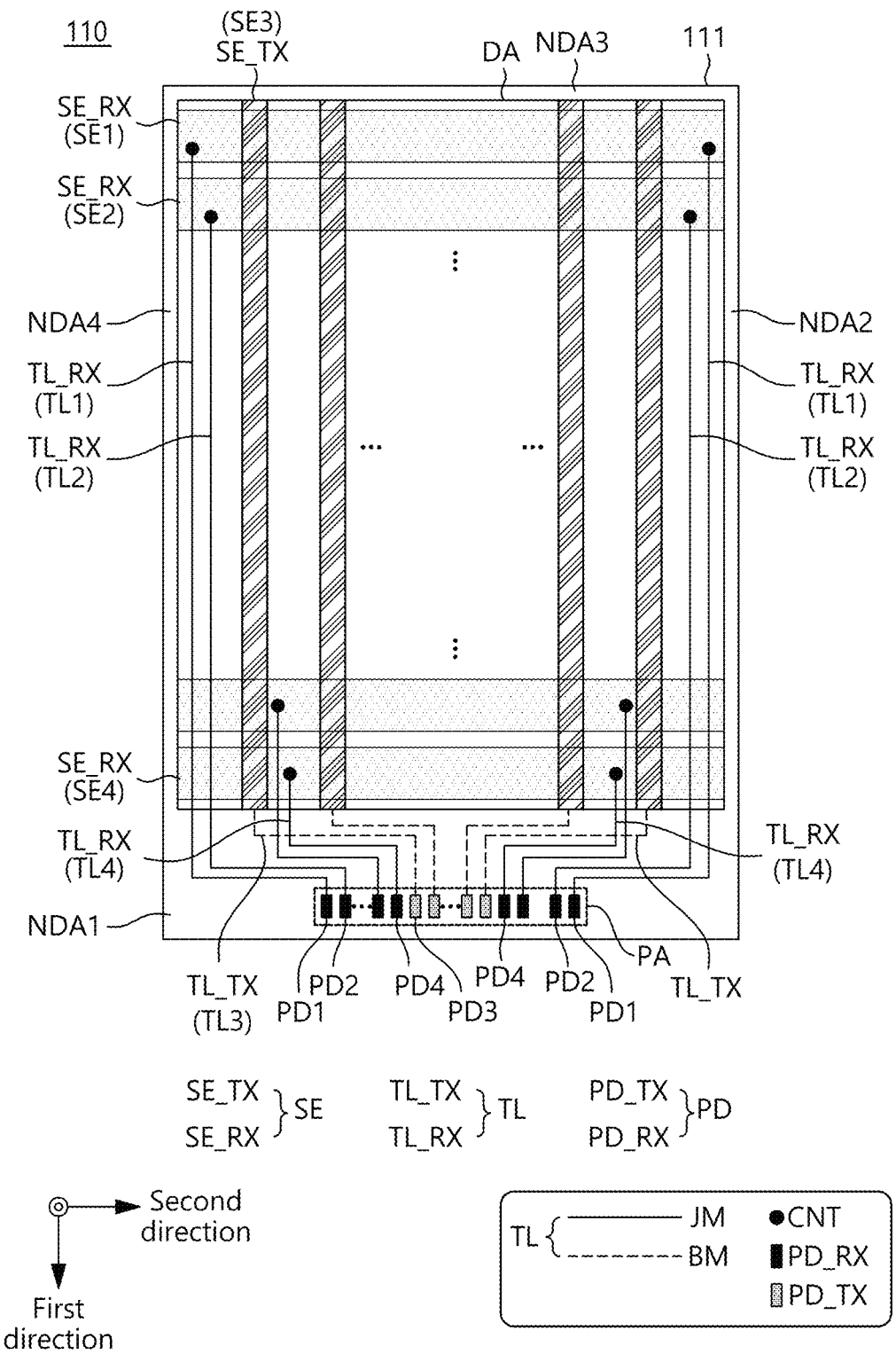

FIG. 5 is another plan view illustrating a touch sensor included in a display panel 110 according to one or more embodiments of the disclosure.

Referring to FIG. 5, in the touch sensor included in the display panel 110 according to one or more embodiments of the disclosure, among the plurality of contact holes CNTs where the plurality of reception sensor electrodes SE_RX and the plurality of reception touch routing lines TL_RX are connected, some of the contact holes CNTs can be positioned farther out from the outermost transmission touch routing line TL_TX among the plurality of transmission touch routing lines TL_TX, and other contact holes CNTs can be positioned farther in from the outermost transmission touch routing line TL_TX among the plurality of third touch routing lines TL_TX and some transmission sensor electrodes SE_TX (e.g., the third sensor electrode SE3 disposed at the outermost side).

For example, the reception touch routing lines TL_RX respectively corresponding to the different reception sensor electrodes SE_RX can be disposed with the transmission sensor electrode SE_TX (e.g., the third sensor electrode SE3) interposed therebetween.

Referring to FIG. 5, some of the plurality of contact holes CNTs where the plurality of reception sensor electrodes SE_RX and the plurality of reception touch routing lines TL_RX are connected can be positioned between two adjacent transmission touch routing lines TL_TX (e.g., some of the reception touch routing lines TL_RX can be routed through the middle of the display area DA to connect to the corresponding reception sensor electrodes SE_RX).

Referring to FIG. 5, at least one (e.g., TL4) of the plurality of reception touch routing lines TL_RX can cross some of the plurality of transmission touch routing lines TL_TX. In other words, at least one (e.g., TL4) of the plurality of reception touch routing lines TL_RX can overlap with some of the plurality of transmission touch routing lines TL_TX.

In the touch sensor of FIGS. 3, 4, and 5, each of the plurality of transmission sensor electrodes SE_TX can be disposed to extend in a first direction (e.g., a column direction), and each of the plurality of reception sensor electrodes SE_RX can be disposed to extend in a second direction (e.g., a row direction).

In this situation, the touch driving circuit 160 can supply a touch driving signal having a signal waveform whose voltage level varies over time to at least one of the plurality of transmission sensor electrodes SE_TX disposed to extend in the first direction, and can sense at least one of the plurality of reception sensor electrodes SE_RX disposed to extend in the second direction, respectively.

Figure 6:
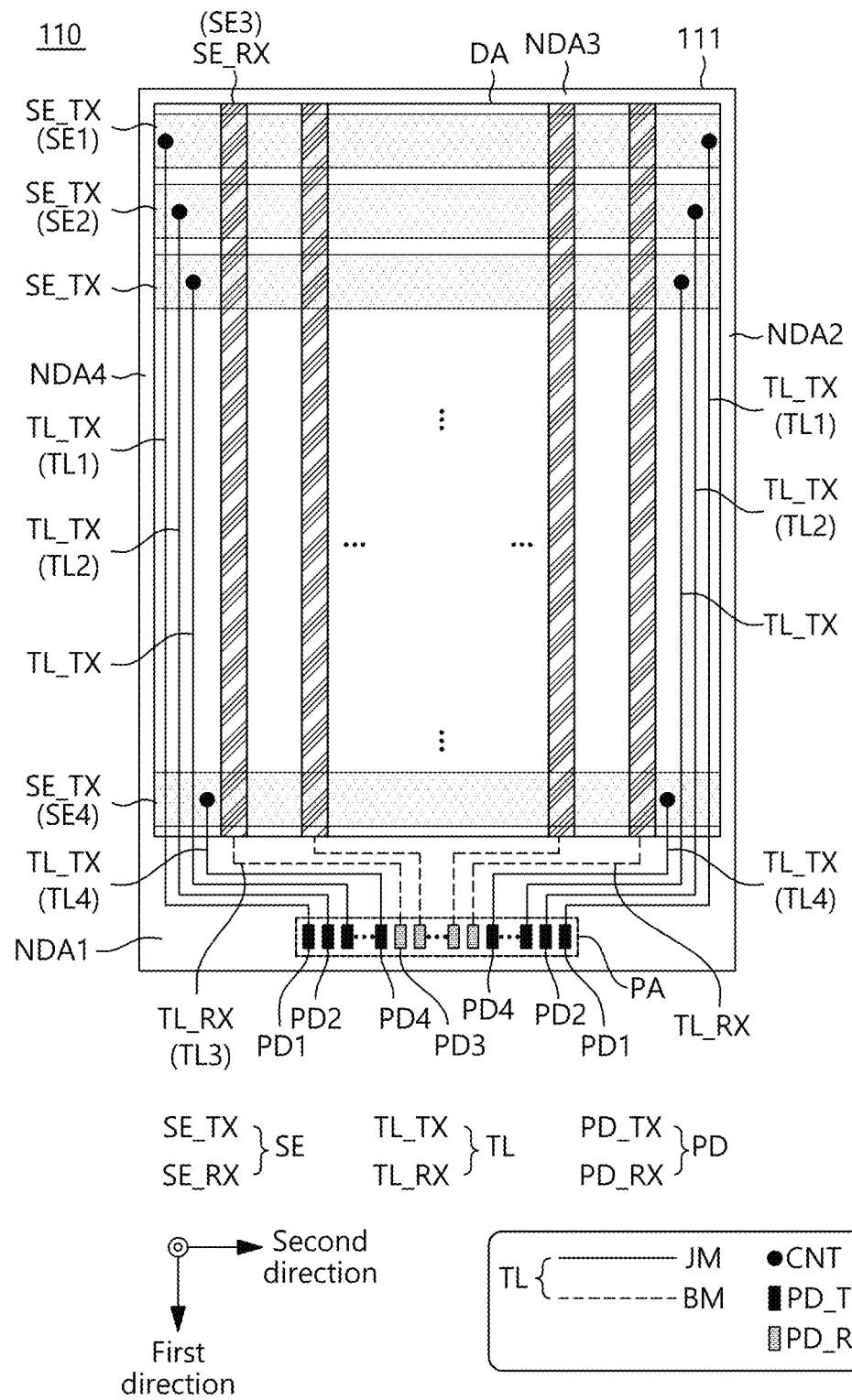

FIG. 6 is another plan view illustrating a touch sensor included in a display panel 110 according to one or more embodiments of the disclosure.

Referring to FIG. 6, in the touch sensor included in the display panel 110 according to one or more embodiments of the disclosure, each of the plurality of transmission sensor electrodes SE_TX can be disposed to extend in the second direction (e.g., row direction), and each of the plurality of reception sensor electrodes SE_RX can be disposed to extend in the first direction (e.g., column direction).

In this situation, the touch driving circuit 160 can supply a touch driving signal having a signal waveform whose voltage level varies over time to at least one of the plurality of transmission sensor electrodes SE_TX disposed to extend in the second direction and can sense at least one of the plurality of reception sensor electrodes SE_RX disposed to extend in the first direction.

In FIGS. 3 to 7, the plurality of sensor electrodes SE disposed to extend in the second direction can include a first sensor electrode SE1, a second sensor electrode SE2, and a fourth sensor electrode SE4, and the plurality of sensor electrodes SE disposed to extend in the first direction can include a third sensor electrode SE3.

For example, in FIGS. 3, 4, 5, and 7, the plurality of reception sensor electrodes SE_RX extending in the second direction can include a first sensor electrode SE1, a second sensor electrode SE2, and a fourth sensor electrode SE4, and the plurality of transmission sensor electrodes SE_TX extending in the first direction can include a third sensor electrode SE3.

As another example, in FIG. 6, the plurality of transmission sensor electrodes SE_TX extending in the second direction include a first sensor electrode SE1, a second sensor electrode SE2, and a fourth sensor electrode SE4, and the plurality of reception sensor electrodes SE_RX extending in the first direction include a third sensor electrode SE3.

As illustrated in FIGS. 3, 4, 5, and 6, at least one first touch routing line TL1 can be electrically connected to two opposite ends of the first sensor electrode SE1 disposed to extend in the second direction. In other words, one or more first touch routing lines TL1 can be electrically connected to one end (e.g., a left portion) of two opposite ends of the first sensor electrode SE1, and one or more first touch routing lines TL1 can be electrically connected to the other end (e.g., a right portion) of the two opposite ends of the first sensor electrode SE1. In this situation, as signals are transferred from two opposite sides of the first sensor electrode SE1, even when the first sensor electrode SE1 is longer in the second direction, the signal transmission delay at the first sensor electrode SE1 can be reduced and touch sensing accuracy can be improved.

Likewise, at least one second touch routing line TL2 can be electrically connected to two opposite ends of the second sensor electrode SE2 disposed to extend in the second direction. At least one fourth touch routing line TL4 can be electrically connected to two opposite ends of the fourth sensor electrode SE4 disposed to extend in the second direction.

Alternatively, at least one first touch routing line TL1 can be electrically connected to only one end of two opposite ends of the first sensor electrode SE1 disposed to extend in the second direction. At least one second touch routing line TL2 can be electrically connected to only one end of two opposite ends of the second sensor electrode SE2 disposed to extend in the second direction. At least one fourth touch routing line TL4 can be electrically connected to only one end of two opposite ends of the fourth sensor electrode SE4 disposed to extend in the second direction.

As illustrated in FIGS. 3, 4, 5, and 6, the two first touch routing lines TL1 connected to two opposite ends of the first sensor electrode SE1 can be electrically connected to two first pads PD1. The two second touch routing lines TL2 connected to two opposite ends of the second sensor electrode SE2 can be electrically connected to two second pads PD2. The two fourth touch routing lines TL4 connected to two opposite ends of the fourth sensor electrode SE4 can be electrically connected to two fourth pads PD4.

Figure 7:
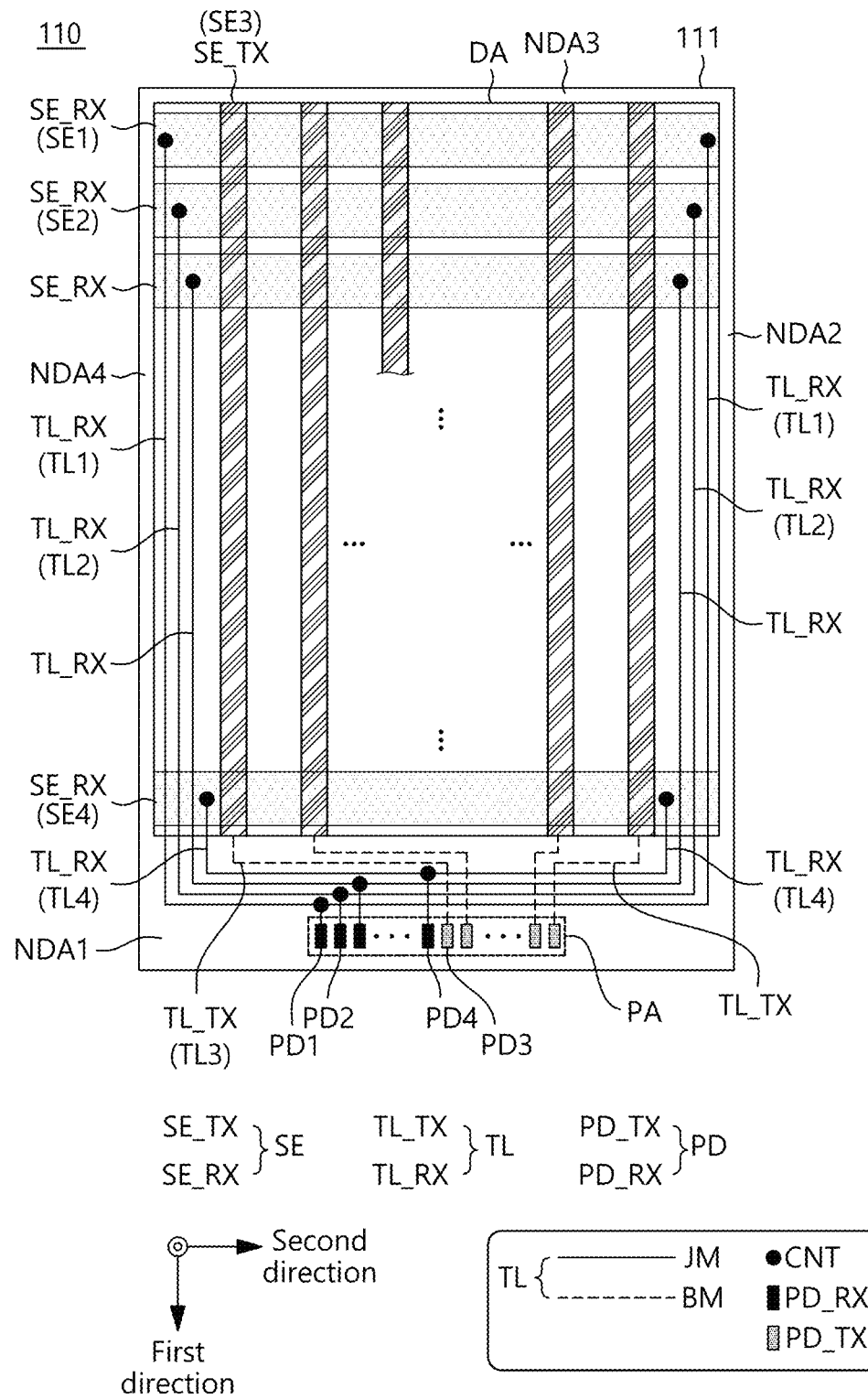

FIG. 7 is another plan view illustrating a touch sensor included in a display panel 110 according to one or more embodiments of the disclosure.

Referring to FIG. 7, two first touch routing lines TL1 can be electrically connected to two opposite ends of the first sensor electrode SE1 disposed to extend in the second direction. In other words, one first touch routing line TL1 can be electrically connected to one end of two opposite ends of the first sensor electrode SE1, and another one first touch routing line TL1 can be electrically connected to the other end of the two opposite ends of the first sensor electrode SE1. In this situation, when the first sensor electrode SE1 is longer in the second direction, the signal transmission delay at the first sensor electrode SE1 can be reduced.

Likewise, two second touch routing lines TL2 can be electrically connected to two opposite ends of the second sensor electrode SE2 disposed to extend in the second direction. Two fourth touch routing lines TL4 can be electrically connected to two opposite ends of the fourth sensor electrode SE4 disposed to extend in the second direction.

As described above, by connecting two touch routing lines TL to one sensor electrode SE, a signal transmission delay occurring in the sensor electrode SE can be reduced.

Referring to FIG. 7, two first touch routing lines TL1 connected to two opposite ends of the first sensor electrode SE1 can be commonly connected to one first pad PD1. Two second touch routing lines TL2 connected to two opposite ends of the second sensor electrode SE2 can be commonly connected to one second pad PD2. Two fourth touch routing lines TL4 connected to two opposite ends of the fourth sensor electrode SE4 can be commonly connected to one fourth pad PD4.

According to this pad shared structure, one pad can be connected to two touch routing lines TL connected to two opposite ends of one sensor electrode SE. Accordingly, the number of pads and the size of the pad area PA in the display panel 110 can be reduced, and the number of pads (the number of channels) of the touch driving circuit 160 connected to the pad area PA can be reduced. Accordingly, the size of the touch driving circuit 160 can also be reduced. Also, the transmission touch routing lines TL_TX can overlap with the reception touch routing lines TL_RX in the first non-display area to reach their corresponding pads, in order to save even more space and further reduce the wiring footprint (e.g., as shown in FIG. 7).

Referring to FIGS. 3 to 7, the plurality of transmission pads PD_TX and the plurality of reception pads PD_RX disposed in the pad area PD can be arranged together for each type. In other words, the plurality of transmission pads PD_TX can be arranged together, and the plurality of reception pads PD_RX can be arranged together.

Alternatively, the plurality of transmission pads PD_TX and the plurality of reception pads PD_RX disposed in the pad area PD can be in mixed arrangement and the routing lines can overlap with each other.

Referring to FIGS. 3, 4, and 6, in the first non-display area NDA1, the plurality of transmission touch routing lines TL_TX and the plurality of reception touch routing lines TL_RX may not cross each other. In this situation, the plurality of transmission touch routing lines TL_TX and the plurality of reception touch routing lines TL_RX may not overlap with each other in the vertical direction. Accordingly, the plurality of transmission touch routing lines TL_TX and the plurality of reception touch routing lines TL_RX can be disposed in different metal layers or can be disposed in the same metal layer.

Referring to FIGS. 5 and 7, in the first non-display area NDA1, all or some of the plurality of reception touch routing lines TL_RX can cross all or some of the plurality of transmission touch routing lines TL_TX. In this situation, the plurality of transmission touch routing lines TL_TX and the plurality of reception touch routing lines TL_RX can overlap with each other in the vertical direction, which can save space. Accordingly, the plurality of transmission touch routing lines TL_TX and the plurality of reception touch routing lines TL_RX should be disposed in different metal layers.

For example, as illustrated in FIGS. 3, 4, 5, and 7, when each of the plurality of transmission sensor electrodes SE_TX is disposed to extend in the first direction and each of the plurality of reception sensor electrodes SE_RX is disposed to extend in the second direction, the plurality of transmission touch routing lines TL_TX electrically connected to the plurality of transmission sensor electrodes SE_TX can be disposed in the bridge metal layer, and the plurality of reception touch routing lines TL_RX electrically connected to the plurality of reception sensor electrodes SE_RX can be disposed in the jumping metal layer. In other words, the plurality of transmission touch routing lines TL_TX electrically connected to the plurality of transmission sensor electrodes SE_TX can include a bridge metal BM, and the plurality of reception touch routing lines TL_RX electrically connected to the plurality of reception sensor electrodes SE_RX can include a jumping metal JM.

For example, as illustrated in FIG. 6, when each of the plurality of transmission sensor electrodes SE_TX is disposed to extend in the second direction and each of the plurality of reception sensor electrodes SE_RX is disposed to extend in the first direction, the plurality of transmission touch routing lines TL_TX electrically connected to the plurality of transmission sensor electrodes SE_TX can be disposed in the jumping metal layer, and the plurality of reception touch routing lines TL_RX electrically connected to the plurality of reception sensor electrodes SE_RX can be disposed in the bridge metal layer. In other words, the plurality of transmission touch routing lines TL_TX electrically connected to the plurality of transmission sensor electrodes SE_TX can include the jumping metal JM, and the plurality of reception touch routing lines TL_RX electrically connected to the plurality of reception sensor electrodes SE_RX can include the bridge metal BM. Referring to FIGS. 3 to 7, the substrate 111 can include a display area DA in which a plurality of subpixels SP are disposed and a non-display area NDA including a pad area PA positioned in a first direction from the display area DA.

Referring to FIGS. 3 to 7, the non-display area NDA can include a first non-display area NDA1 positioned in the first direction from the display area DA, a second non-display area NDA2 positioned in the second direction from the display area DA, a third non-display area NDA3 positioned in a direction opposite to the first direction from the display area DA, and a fourth non-display area NDA4 positioned in a direction opposite to the second direction from the display area DA. For example, the first direction can be a column direction (Y-axis direction), and the second direction crossing the first direction can be a row direction (X-axis direction).

Referring to FIGS. 3 to 7, the plurality of sensor electrodes SE can include a first sensor electrode SE1 disposed in the display area DA and extending in the second direction, and a second sensor electrode SE2 disposed in the display area DA and extending in the second direction.

Referring to FIGS. 3 to 7, the plurality of pads PD can include a first pad PD1 disposed in the pad area PA and a second pad PD2 disposed in the pad area PA.

Referring to FIGS. 3 to 7, the plurality of touch routing lines TL can include a first touch routing line TL1 electrically connecting the first sensor electrode SE1 and the first pad PD1, and a second touch routing line TL2 electrically connecting the second sensor electrode SE2 and the second pad PD2.

Referring to FIGS. 3 to 7, the second sensor electrode SE2 can be positioned closer to the pad area PA than the first sensor electrode SE1. In this situation, as the display panel 110 has an internal touch routing line structure, the first touch routing line TL1 can overlap with the second sensor electrode SE2.

Referring to FIGS. 3 to 7, the first touch routing line TL1 and the second touch routing line TL2 can extend to the pad area PA across the display area DA in the first direction.

Referring to FIGS. 3 to 7, the plurality of sensor electrodes SE can further include a third sensor electrode SE3 disposed in the display area DA and extending in the first direction and a fourth sensor electrode SE4 disposed in the display area DA and extending in the second direction, the plurality of pads PD can further include a third pad PD3 disposed in the pad area PA and a fourth pad PD4 disposed in the pad area PA, and the plurality of touch routing lines TL can include a third touch routing line TL3 for electrically connecting the third sensor electrode SE3 and the third pad PD3 and a fourth sensor routing line TL4 for electrically connecting the fourth sensor electrode SE4 and the fourth pad PD4.

The fourth sensor electrode SE4 can be disposed parallel to the first sensor electrode SE1 and the second sensor electrode SE2.

The fourth sensor electrode SE4 can be positioned closer to the pad area PA than the first sensor electrode SE1 and the second sensor electrode SE2.

According to the internal touch routing line structure of the display panel 110, each of the first touch routing line TL1, the second touch routing line TL2, and the fourth touch routing line TL4 can overlap with the fourth sensor electrode SE4.

Referring to FIGS. 3, 4, 5, and 7, among the first sensor electrode SE1, the second sensor electrode SE2, the third sensor electrode SE3, and the fourth sensor electrode SE4, the third sensor electrode SE3 can be a transmission sensor electrode SE_TX, and the first sensor electrode SE1, the second sensor electrode SE2, and the fourth sensor electrode SE4 can be reception sensor electrodes SE_RX.

Accordingly, a signal (touch driving signal) whose voltage level is changed can be supplied to the third sensor electrode SE3 from the touch driving circuit 160.

Referring to FIG. 6, among the first sensor electrode SE1, the second sensor electrode SE2, the third sensor electrode SE3, and the fourth sensor electrode SE4, the third sensor electrode SE3 can be a reception sensor electrode SE_RX, and the first sensor electrode SE1, the second sensor electrode SE2, and the fourth sensor electrode SE4 can be transmission sensor electrodes SE_TX.

Each of the first sensor electrode SE1, the second sensor electrode SE2, and the fourth sensor electrode SE4 can be supplied with a signal (a touch driving signal) whose voltage level is changed from the touch driving circuit 160.

Referring to FIG. 4, the number (e.g., two) of the first touch routing lines TL1 connected to the first sensor electrode SE1 can be larger than the number (e.g., one) of the fourth touch routing lines TL4 connected to the fourth sensor electrode SE4. For example, the number of first touch routing lines TL1 connected to the first sensor electrode SE1 can be twice the number of fourth touch routing lines TL4 connected to the fourth sensor electrode SE4. As illustrated in FIG. 4, the number of first touch routing lines TL1 connected to the first sensor electrode SE1 can be four, and the number of fourth touch routing lines TL4 connected to the fourth sensor electrode SE4 can be two. As another example, the number of first touch routing lines TL1 connected to the first sensor electrode SE1 can be two, and the number of fourth touch routing lines TL4 connected to the fourth sensor electrode SE4 can be one.

Referring to FIGS. 3 to 7, the third sensor electrode SE3 can cross the first sensor electrode SE1, the second sensor electrode SE2, and the fourth sensor electrode SE4.

Referring to FIGS. 3, 4, 6, and 7, the first touch routing line TL1, the second touch routing line TL2, and the fourth touch routing line TL4 can be disposed on the outermost periphery of the third sensor electrode SE3 disposed at the outermost periphery of the sensor electrodes SE disposed to extend in the first direction.

Referring to FIG. 5, among the first touch routing line TL1, the second touch routing line TL2 and the fourth touch routing line TL4, the first touch routing line TL1 and the second touch routing line TL2 can be disposed at the outer periphery of the third sensor electrode SE3, and the fourth touch routing line TL4 can be disposed at the inner periphery of the third sensor electrode SE3.

In this situation, the third sensor electrode SE3 can be disposed between the first touch routing line TL1 and the fourth touch routing line TL4. Alternatively, the third sensor electrode SE3 can be disposed between the contact hole CNT of the first touch routing line TL1 and the first sensor electrode SE1, and the contact hole CNT of the fourth touch routing line TL4 and the fourth sensor electrode SE4.

Referring to FIGS. 3 to 7, the plurality of transmission pads PD_TX and the plurality of reception pads PD_RX disposed in the pad area PD can be arranged together for each type. In other words, the plurality of transmission pads PD_TX can be arranged together, and the plurality of reception pads PD_RX can be arranged together.

Alternatively, the plurality of transmission pads PD_TX and the plurality of reception pads PD_RX disposed in the pad area PD can be in a mixed arrangement.

Referring to FIG. 5, when the plurality of transmission pads PD_TX and the plurality of reception pads PD_RX disposed in the pad area PD are disposed together for each type, the fourth pad PD4, which is the reception pad PD_RX, can be disposed between the first pad PD1, which is the reception pad PD_RX, and the third pad PD3, which is the transmission pad PD_TX.

In this situation, the fourth touch routing line TL4 can cross the third touch routing line TL3. Accordingly, the fourth touch routing line TL4 can be positioned in a metal layer different from the third touch routing line TL3. For example, the fourth touch routing line TL4 can include a jumping metal, and the third touch routing line TL3 can include a bridge metal.

When the plurality of transmission pads PD_TX and the plurality of reception pads PD_RX disposed in the pad area PD are disposed to be in a mixed arrangement, unlike FIG. 5, the third pad PD3, which is the transmission pad PD_TX, can be disposed between the first pad PD1, which is the reception pad PD_RX, and the fourth pad PD4, which is the reception pad PD_RX.

The fourth touch routing line TL4 may not cross the third touch routing line TL3. Accordingly, the fourth touch routing line TL4 can be positioned in the same metal layer as the third touch routing line TL3. For example, the fourth touch routing line TL4 and the fourth touch routing line TL4 may include a bridge metal BM or a jumping metal JM.

Hereinafter, for convenience of description, the plurality of sensor electrodes SE disposed to extend in the first direction are the transmission sensor electrodes SE_TX, and the plurality of sensor electrodes SE disposed to extend in the second direction are the reception sensor electrodes SE_RX. However, the following description can be equally applied even when the plurality of sensor electrodes SE disposed to extend in the first direction are the reception sensor electrodes SE_RX, and the plurality of sensor electrodes SE disposed to extend in the second direction are the transmission sensor electrodes SE_TX.

FIG. 8 illustrates, in detail, a partial area 300 of a touch sensor included in a display panel 110 according to one or more embodiments of the disclosure. FIG. 8 is an enlarged view illustrating a partial area 300 of the touch sensor of FIG. 3. In the following description, FIGS. 3 to 7 are also referred to.

As described above, the substrate 111 of the display panel 110 according to one or more embodiments of the disclosure can include a display area DA in which a plurality of subpixels SP are disposed and a non-display area NDA including a pad area PA positioned in a first direction from the display area DA.

Referring to FIG. 8, in a partial area 300 of the touch sensor of FIG. 3, a first reception sensor electrode SE_RX1 and a second reception sensor electrode SE_RX2 extending in the second direction (e.g., row direction) can be disposed, and a first transmission sensor electrode SE_TX1, a second transmission sensor electrode SE_TX2, and a third transmission sensor electrode SE_TX3 extending in the first direction (e.g., column direction) can be disposed. Here, the first direction and the second direction can be directions that cross each other.

Referring to FIG. 8, in the partial area 300 of the touch sensor of FIG. 3, a first reception touch routing line TL_RX1 electrically connected to the first reception sensor electrode SE_RX1 and a second reception touch routing line TL_RX2 electrically connected to the second reception sensor electrode SE_RX2 can be further disposed.

Referring to FIG. 8, the first transmission sensor electrode SE_TX1, the second transmission sensor electrode SE_TX2, and the third transmission sensor electrode SE_TX3 can be electrically connected to the first transmission touch routing line TL_TX1, the second transmission touch routing line TL_TX2, and the third transmission touch routing line TL_TX3, respectively, in or near the first non-display area NDA1.

Hereinafter, the first reception sensor electrode SE_RX1 can be referred to as a first sensor electrode SE1, the second reception sensor electrode SE_RX2 can be referred to as a second sensor electrode SE2, and the first transmission sensor electrode SE_TX1 can be referred to as a third sensor electrode SE3. Further, the first reception touch routing line TL_RX1 can be referred to as a first touch routing line TL1, the second reception touch routing line TL_RX2 can be referred to as a second touch routing line TL2, and the first transmission touch routing line TL_TX1 can be referred to as a third touch routing line TL3. Further, the first reception pad PD_RX to which the first reception sensor electrode SE_RX1 is connected through the first reception touch routing line TL_RX1 can be referred to as a first pad PD1, the second reception pad PD_RX to which the second reception sensor electrode SE_RX2 is connected through the second reception touch routing line TL_RX2 can be referred to as a second pad PD2, and the first transmission pad PD_TX to which the first transmission sensor electrode SE_TX1 is connected through the first transmission touch routing line TL_TX1 can be referred to as a third pad PD3.

The first sensor electrode SE1 can include a plurality of first sub sensor electrode SUB1a, SUB1b, SUB1c, and SUB1d disposed in the display area DA and arranged in the second direction, and at least one first bridge BRG1 electrically connecting the plurality of first sub sensor electrodes.

The second sensor electrode SE2 can include a plurality of second sub sensor electrodes SUB2a, SUB2b, SUB2c, and SUB2d disposed in the display area DA and arranged in the second direction, and at least one second bridge BRG2 electrically connecting the plurality of second sub sensor electrodes SUB2a, SUB2b, SUB2c, and SUB2d.

The third sensor electrode SE3 can be disposed in the display area DA in the first direction and pass between two adjacent first sub sensor electrodes (e.g., SUB1a and SUB1b) among the plurality of first sub sensor electrodes SUB1a, SUB1b, SUB1c, and SUB1d included in the first sensor electrode SE1.

Further, the third sensor electrode SE3 can be disposed in the display area DA, in the first direction and pass between two adjacent second sub sensor electrodes (e.g., SUB2a and SUB2b) among the plurality of second sub sensor electrodes SUB2a, SUB2b, SUB2c, and SUB2d included in the second sensor electrode SE2.

In other words, the third sensor electrode SE3 can be disposed to extend in the first direction while passing between two first sub sensor electrodes (e.g., SUB1a and SUB1b) included in the first sensor electrode SE1 and between two second sub sensor electrodes (e.g., SUB2a and SUB2b) included in the second sensor electrode SE2.

The third sensor electrode SE3 can cross and overlap with the first bridge BRG1 and the second bridge BRG2. However, the third sensor electrode SE3 can be electrically separated (isolated) from the first bridge BRG1 and the second bridge BRG2.

The first touch routing line TL1 can electrically connect at least one (e.g., SUB1a) of the plurality of first sub sensor electrodes SUB1a, SUB1b, SUB1c, and SUB1d included in the first sensor electrode SE1 to the first pad PD1 disposed in the pad area PA.

In other words, a part of the first touch routing line TL1 can be electrically connected to at least one (e.g., SUB1a) of the plurality of first sub sensor electrodes SUB1a, SUB1b, SUB1c, and SUB1d included in the first sensor electrode SE1 through the contact hole CNT, and another part of the first touch routing line TL1 can be electrically connected to the first pad PD1.

The second touch routing line TL2 can electrically connect at least one (e.g., SUB2a) of the plurality of second sub sensor electrodes SUB2a, SUB2b, SUB2c, and SUB2d included in the second sensor electrode SE2 to the second pad PD2 disposed in the pad area PA.

In other words, a part of the second touch routing line TL2 can be electrically connected to at least one (e.g., SUB2a) of the plurality of second sub sensor electrodes SUB2a, SUB2b, SUB2c, and SUB2d included in the second sensor electrode SE2 through the contact hole CNT, and another part of the second touch routing line TL2 can be electrically connected to the second pad PD2.

The third touch routing line TL3 can electrically connect the third sensor electrode SE3 and the third pad PD3 disposed in the pad area PA.

The first sensor electrode SE1 and the second sensor electrode SE2 can be disposed parallel to each other. The second sensor electrode SE2 can be disposed closer to the pad area PA than the first sensor electrode SE1.

The third sensor electrode SE3 can be disposed to cross the first sensor electrode SE1 and the second sensor electrode SE2.

Referring to FIG. 8, as the display panel 110 has an internal touch routing structure, the first touch routing line TL1 can overlap with at least one (e.g., SUB2a) of the plurality of second sub sensor electrodes SUB2a, SUB2b, SUB2c, and SUB2d included in the second sensor electrode SE2.

Referring to FIG. 8, the two first sub sensor electrodes SUB1a and SUB1b included in the first sensor electrode SE1 can be interposed in a first space provided by a narrow portion of the third sensor electrode SE3. The two second sub sensor electrodes SUB2a and SUB2b included in the second sensor electrode SE2 can be interposed in a second space provided by a narrow portion of the third sensor electrode SE3. Accordingly, the effective area of the touch sensor can be considerably expanded to enhance touch sensitivity.

According to the shape of the touch sensor and the internal touch routing structure, the third sensor electrode SE3 can overlap with the first touch routing line TL1 and the second touch routing line TL2.

Referring to FIG. 8, the plurality of first sub sensor electrodes SUB1a, SUB1b, SUB1c, and SUB1d included in the first sensor electrode SE1 can be disposed in the first metal layer SML. The first bridge BRG1 can be disposed in the second metal layer BML different from the first metal layer SML. The first touch routing line TL1 can be disposed across the display area DA in the first direction to extend to the pad area PA, and can be disposed in a third metal layer JML different from the first metal layer SML and the second metal layer BML.

Referring to FIG. 8, the plurality of second sub sensor electrodes SUB2a, SUB2b, SUB2c, and SUB2d included in the second sensor electrode SE2 can be disposed in the first metal layer SML. The second bridge BRG2 can be disposed in the second metal layer BML different from the first metal layer SML. The second touch routing line TL2 can be disposed across the display area DA in the first direction to extend to the pad area PA, and can be disposed in a third metal layer JML different from the first metal layer SML and the second metal layer BML.

Referring to FIG. 8, the third sensor electrode SE3 can be disposed in the first metal layer SML.

Referring to FIG. 8, the third touch routing line TL3 can be disposed in a metal layer different from the first touch routing line TL1 and the second touch routing line TL2.

For example, the first touch routing line TL1 and the second touch routing line TL2 can be disposed in the third metal layer JML, and the third touch routing line TL3 can be disposed in the second metal layer BML.

Hereinafter, for convenience of description, the first metal layer SML is referred to as a sensor metal layer SML, the second metal layer BML is referred to as a bridge metal layer BML, and the third metal layer JML is referred to as a jumping metal layer JML.

FIG. 9 illustrates a unit sensor 800 in a touch sensor included in a display panel 110 according to one or more embodiments of the disclosure. Here, the unit sensor 800 can include an area where one transmission touch electrode SE_TX and one reception touch sensor electrode SE_RX cross each other as illustrated in FIG. 9.

Referring to FIG. 9, each of the plurality of first sub sensor electrodes SUB1a and SUB1b included in the first sensor electrode SE1 can be formed of a mesh-type sensor metal SM disposed in the sensor metal layer SML and having openings OA.

The third sensor electrode SE3 can also be formed of a mesh-type sensor metal SM disposed in the sensor metal layer SML and having openings OA.

Here, each opening OA formed in each of the first sensor electrode SE1 and the third sensor electrode SE3 can correspond to the light emitting area of at least one subpixel SP. In other words, light emitted from the light emitting element ED of the at least one subpixel SP can pass through each opening OA.

Referring to FIG. 9, the two first sub sensor electrodes SUB1a and SUB1b included in the first sensor electrode SE1 can be interposed in a first space provided by a narrow portion of the third sensor electrode SE3.

Referring to FIG. 9, the first bridge BRG1 included in the first sensor electrode SE1 can be disposed in the bridge metal layer BML. The first bridge BRG1 included in the first sensor electrode SE1 can be aligned with the lines of the sensor metal SM constituting the two first sub sensor electrodes SUB1a and SUB1b included in the first sensor electrode SE1.

Referring to FIG. 9, the first bridge BRG1 included in the first sensor electrode SE1 can cross the third sensor electrode SE3.

Referring to FIG. 9, the first bridge BRG1 included in the first sensor electrode SE1 can be bent or curved along the shape of the mesh-type sensor metal SM constituting each of the first sensor electrode SE1 and the third sensor electrode SE3.

The first bridge BRG1 included in the first sensor electrode SE1 can vertically overlap with the mesh-type sensor metal SM constituting each of the first sensor electrode SE1 and the third sensor electrode SE3.

The first bridge BRG1 included in the first sensor electrode SE1 can be disposed to avoid at least one of the openings OA of the first sensor electrode SE1 and the third sensor electrode SE3.

Accordingly, the light emitting area of the subpixel SP can be prevented from being reduced by the first bridge BRG1, and the light emitting areas of the subpixels SP may be widened and the light emitting efficiency can be enhanced.

Referring to FIG. 9, the first touch routing line TL1 electrically connected to the first sensor electrode SE1 can be disposed in the jumping metal layer JML and can be bent or curved along the shape of the sensor metal SM constituting the first sensor electrode SE1.

The first touch routing line TL1 electrically connected to the first sensor electrode SE1 can vertically overlap with the mesh-type sensor metal SM constituting each of the first sensor electrode SE1 and the third sensor electrode SE3.

The first touch routing line TL1 electrically connected to the first sensor electrode SE1 can be disposed to avoid at least one of the openings OA of the first sensor electrode SE1 and the third sensor electrode SE3.

Accordingly, the light emitting area of the subpixel SP can be prevented from being reduced by the first touch routing line TL1, and the light emitting areas of the subpixels SP can be widened and the light emitting efficiency can be enhanced.

Figure 10:
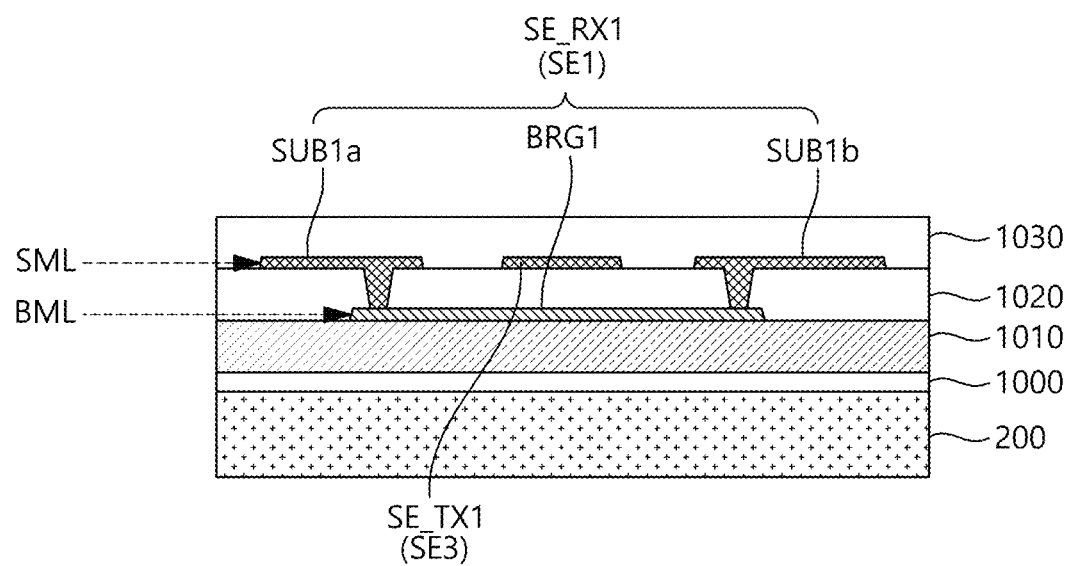
FIGS. 10 and 11 illustrate a stacked structure of a touch sensor included in a display panel according to one or more embodiments of the disclosure.
Figure 11:
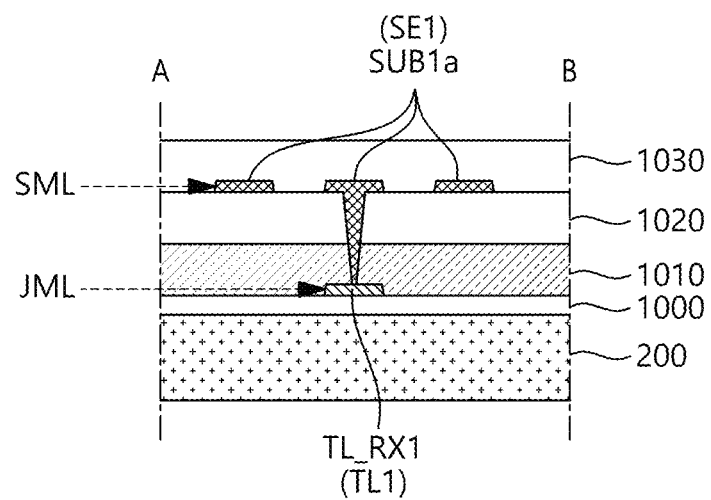

FIGS. 10 and 11 illustrate a stacked structure of a touch sensor included in a display panel 110 according to one or more embodiments of the disclosure. FIG. 10 illustrates a vertical cross-sectional structure of an area 800 in which two first sub sensor electrodes SUB1a and SUB1b are connected by a first bridge BRG1 in FIG. 9. FIG. 11 illustrates a vertical cross-sectional structure along line A-B in an area where the first touch routing line TL1 and the first sub sensor electrode SUB1a are electrically connected as shown in FIG. 9.

Referring to FIGS. 10 and 11, when the display panel 110 is a self-luminous display panel, the display panel 110 can include an encapsulation layer 200 on the light emitting element ED.

Referring to FIGS. 10 and 11, to form a touch sensor, the display panel 110 can further include a first touch interlayer insulation film 1010 on the encapsulation layer 200, a second touch interlayer insulation film 1020 on the first touch interlayer insulation film 1010, and a touch protective film 1030 on the second touch interlayer insulation film 1020.

Referring to FIGS. 10 and 11, a jumping metal layer JML can be disposed between the encapsulation layer 200 and the first touch interlayer insulation film 1010. The bridge metal layer BML can be disposed between the first touch interlayer insulation film 1010 and the second touch interlayer insulation film 1020. A sensor metal layer SML can be disposed between the second touch interlayer insulation film 1020 and the touch protective film 1030.

Referring to FIGS. 10 and 11, to form a touch sensor, the display panel 110 can further include a touch buffer film 1000 between the encapsulation layer 200 and the first touch interlayer insulation film 1010. In this situation, the jumping metal layer JML can be disposed between the touch buffer film 1000 and the first touch interlayer insulation film 1010.

In one or more embodiments of the disclosure, a metal can include the jumping metal JM when the metal is disposed in the jumping metal layer JML, a metal can include the bridge metal BM when the metal is disposed in the bridge metal layer BML, and a metal can include the sensor metal SM when the metal is disposed in the sensor metal layer SML.

Referring to FIGS. 10 and 11, the second touch interlayer insulation film 1020 can include an inorganic film. Alternatively, the second touch interlayer insulation film 1020 can include an organic film.

Referring to FIGS. 10 and 11, when the second touch interlayer insulation film 1020 includes an organic film, noise between the sensor metal layer SML on the second touch interlayer insulation film 1020 and the bridge metal layer BML or the jumping metal layer JML under the second touch interlayer insulation film 1020 can be reduced. For example, parasitic capacitance between the sensor metal layer SML on the second touch interlayer insulation film 1020 and the bridge metal layer BML or the jumping metal layer JML under the second touch interlayer insulation film 1020 can be reduced.

Referring to FIGS. 10 and 11, the first touch interlayer insulation film 1010 can include an inorganic film. Alternatively, the first touch interlayer insulation film 1010 can include an organic film.

Referring to FIGS. 10 and 11, when the first touch interlayer insulation film 1010 includes an organic film, noise between the sensor metal layer SML or the bridge metal layer BML on the first touch interlayer insulation film 1010 and the jumping metal layer JML under the first touch interlayer insulation film 1010 can be reduced. For example, when the first touch interlayer insulation film 1010 includes an organic film, parasitic capacitance between the sensor metal layer SML or the bridge metal layer BML on the first touch interlayer insulation film 1010 and the jumping metal layer JML under the first touch interlayer insulation film 1010 can be reduced.

Referring to FIG. 10, to configure the first sensor electrode SE1, two adjacent first sub sensor electrodes SUB1a and SUB1b can be disposed on the second touch interlayer insulation film 1020 and can be electrically connected to the first bridge BRG1 disposed in the bridge metal layer BML through a contact hole of the second touch interlayer insulation film 1020.

Referring to FIG. 10, a third sensor electrode SE3 can be disposed between two first sub sensor electrodes SUB1a and SUB1b. Here, the two first sub sensor electrodes SUB1a and SUB1b and the third sensor electrode SE3 can be disposed together in the sensor metal layer SML.

Referring to FIG. 10, a portion of the first bridge BRG1 disposed in the bridge metal layer BML can overlap with the third sensor electrode SE3 disposed in the sensor metal layer SML.

Referring to FIG. 11, the mesh-type first sub sensor electrode SUB1a included in the first sensor electrode SE1 can be disposed on the second touch interlayer insulation film 1020 and can be electrically connected to the first touch routing line TL1 disposed in the jumping metal layer JML through a contact hole of the second touch interlayer insulation film 1020 and the first touch interlayer insulation film 1010.

Hereinafter, the vertical structure of the display panel 110 according to the above-described one or more embodiments of the disclosure is described in more detail with reference to FIGS. 12 to 19.

Figure 12:
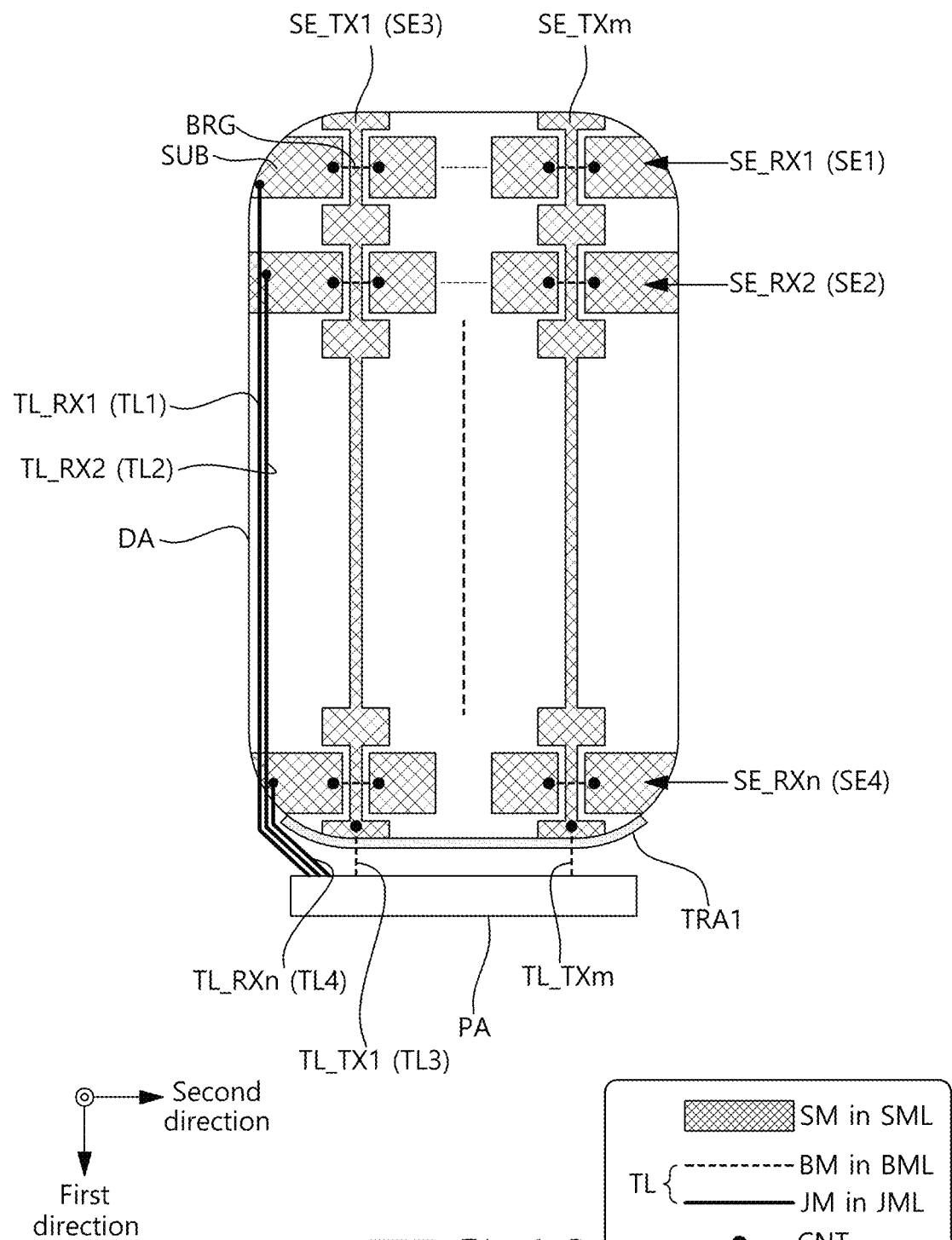
FIG. 12 is a plan view illustrating a display panel according to one or more embodiments of the disclosure.

FIG. 12 is a plan view of a display panel 110 according to one or more embodiments of the disclosure. In the following description, FIGS. 2A and 3 are also referred to.

Referring to FIG. 12, a touch sensor according to one or more embodiments of the disclosure can include m transmission sensor electrodes SE_TX1 to SE_TXm and n reception sensor electrodes SE_RX1 to SE_RXn. Here, m is a natural number of 2 or more, and n is a natural number of 2 or more.

Each of the n reception sensor electrodes SE_RX1 to SE_RXn can be formed of at least one bridge BRG electrically connecting at least one of the plurality of reception sub sensor electrodes SUB and at least another one of the plurality of reception sub sensor electrodes SUB.

Referring to FIG. 12, the m or more transmission touch routing lines TL_TX1 to TL_TXm can electrically connect the m transmission sensor electrodes SE_TX1 to SE_TXm and the transmission pads PD_TX disposed in the pad area PA.

Referring to FIG. 12, m or more transmission touch routing lines TL_TX1 to TL_TXm can extend to the pad area PA through the first touch routing area TRA1 in the first non-display area NDA1.

Referring to FIG. 12, the n or more reception touch routing lines TL_RX1 to TL_RXn can electrically connect the n reception sensor electrodes SE_RX1 to SE_RXn and the reception pads PD_RX disposed in the pad area PA.

Referring to FIG. 12, the n or more reception touch routing lines TL_RX1 to TL_RXn can extend to the pad area PA in the first non-display area NDA1 across the display area DA in the first direction without passing through the second non-display area NDA2 and the fourth non-display area NDA4. Accordingly, the size of the second non-display area NDA2, which is the right bezel area, and the size of the fourth non-display area NDA4, which is the left bezel area, can be significantly reduced.

Referring to FIG. 12, the contact holes CNTs where the n or more reception touch routing lines TL_RX1 to TL_RXn and the n reception sensor electrodes SE_RX1 to SE_RXn are connected can be positioned farther out from the first transmission sensor electrode SE_TX1 disposed at the outermost periphery among the m transmission sensor electrodes SE_TX1 to SE_TXm.

Accordingly, the n or more reception touch routing lines TL_RX1 to TL_RXn can be disposed to extend to the pad area PA without passing through the first touch routing area TRA1 in the first non-display area NDA1. In other words, the n or more reception touch routing lines TL_RX1 to TL_RXn may not overlap with the m or more transmission touch routing lines TL_TX1 to TL_TXm disposed in the first touch routing area TRA1. In other words, noise (e.g., parasitic capacitance) between the reception touch routing lines TL_RX and the transmission touch routing lines TL_TX can be avoided, since they do not overlap with each other (e.g., as shown in FIG. 12).

Hereinafter, the first reception sensor electrode SE_RX1 can be referred to as a first sensor electrode SE1, the second reception sensor electrode SE_RX2 can be referred to as a second sensor electrode SE2, the nth reception sensor electrode SE_RXn can be referred to as a fourth sensor electrode SE4, and the first transmission sensor electrode SE_TX1 can be referred to as a third sensor electrode SE3. Further, the first reception touch routing line TL_RX1 can be referred to as a first touch routing line TL1, the second reception touch routing line TL_RX2 can be referred to as a second touch routing line TL2, the nth reception touch routing line TL_RXn can be referred to as a fourth touch routing line TL4, and the first transmission touch routing line TL_TX1 can be referred to as a third touch routing line TL3.

Figure 13:
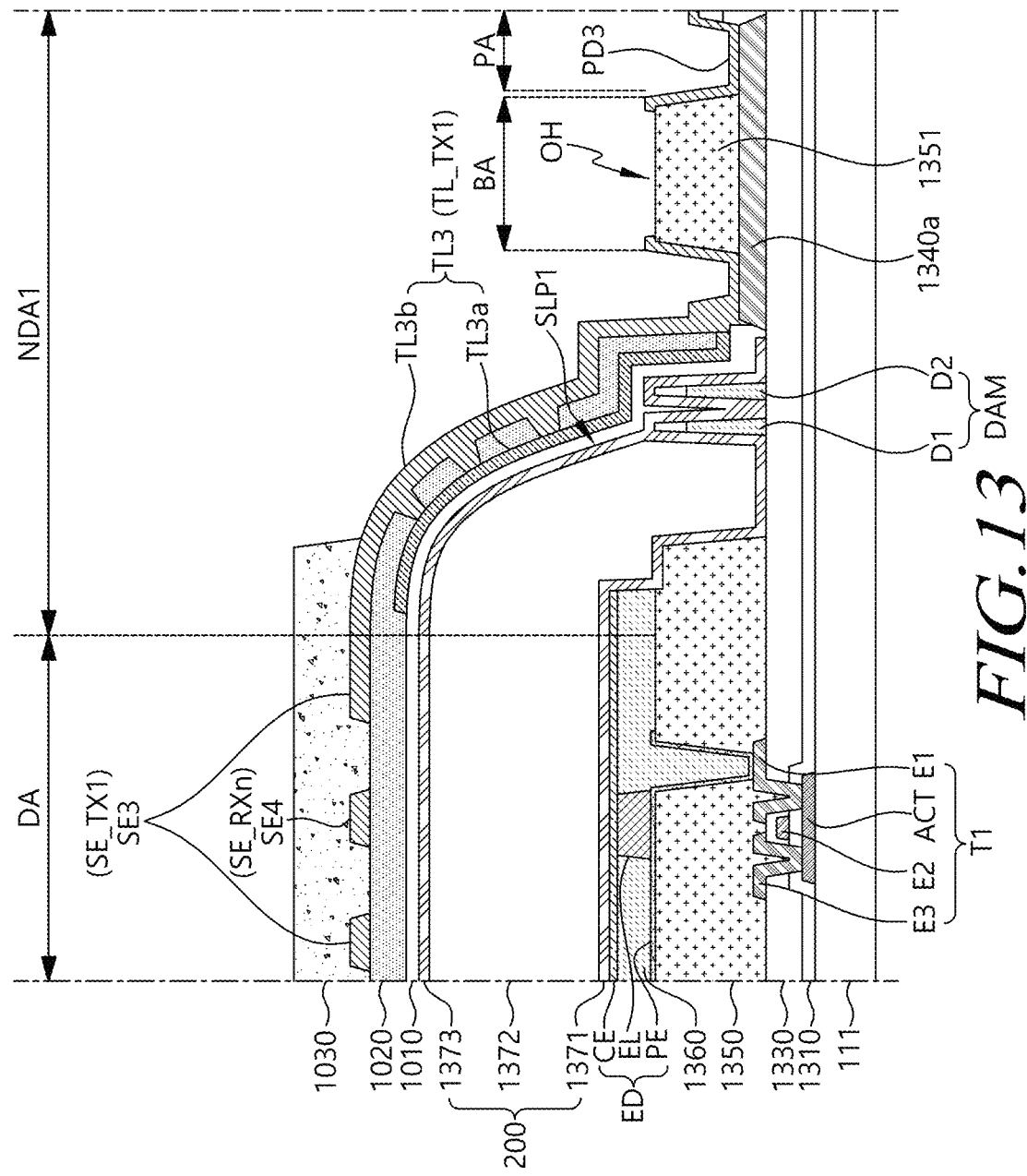
FIGS. 13, 14, and 15 are cross-sectional views illustrating aspects of a display panel according to one or more embodiments of the disclosure.
Figure 14:
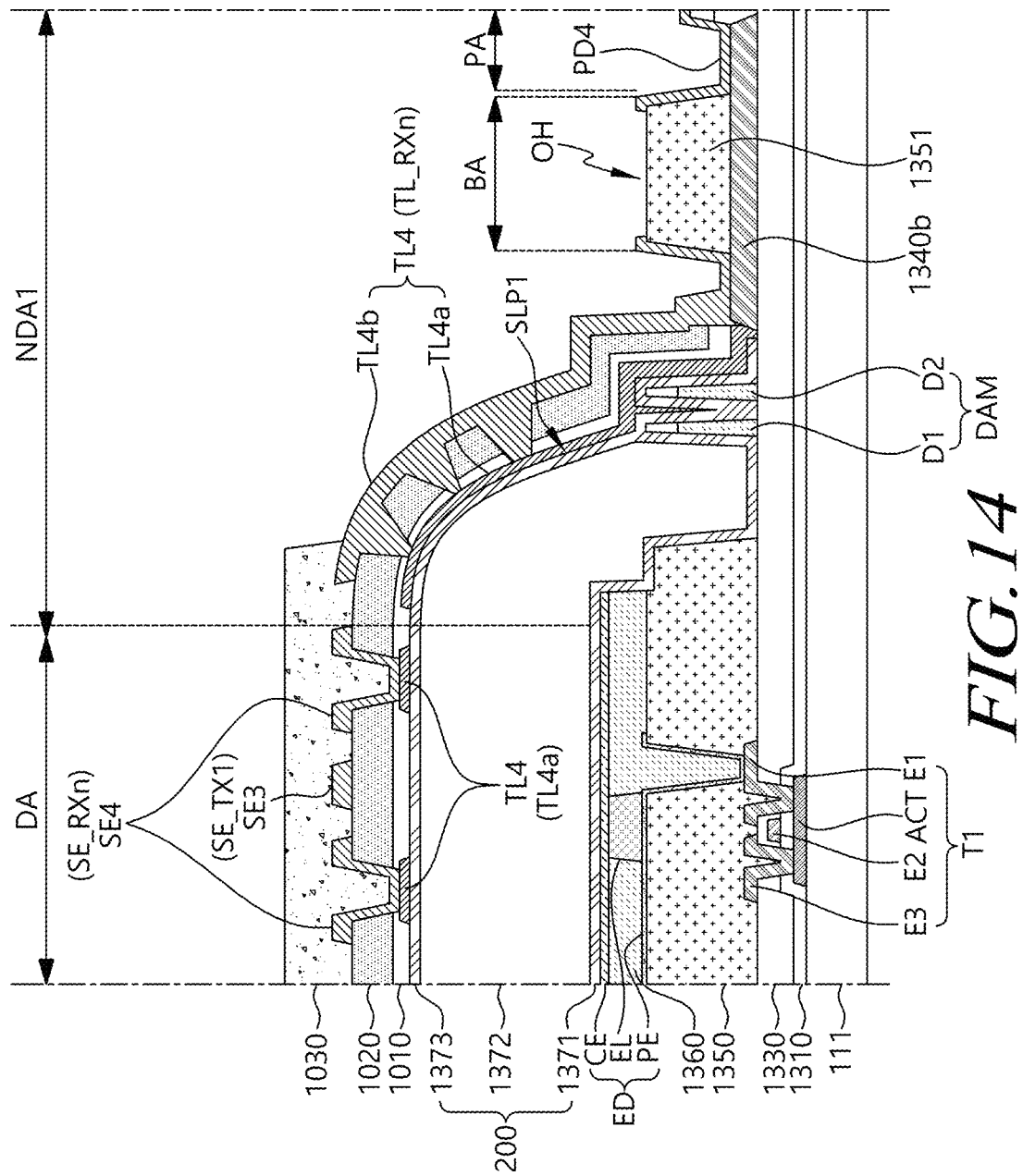
Figure 15:
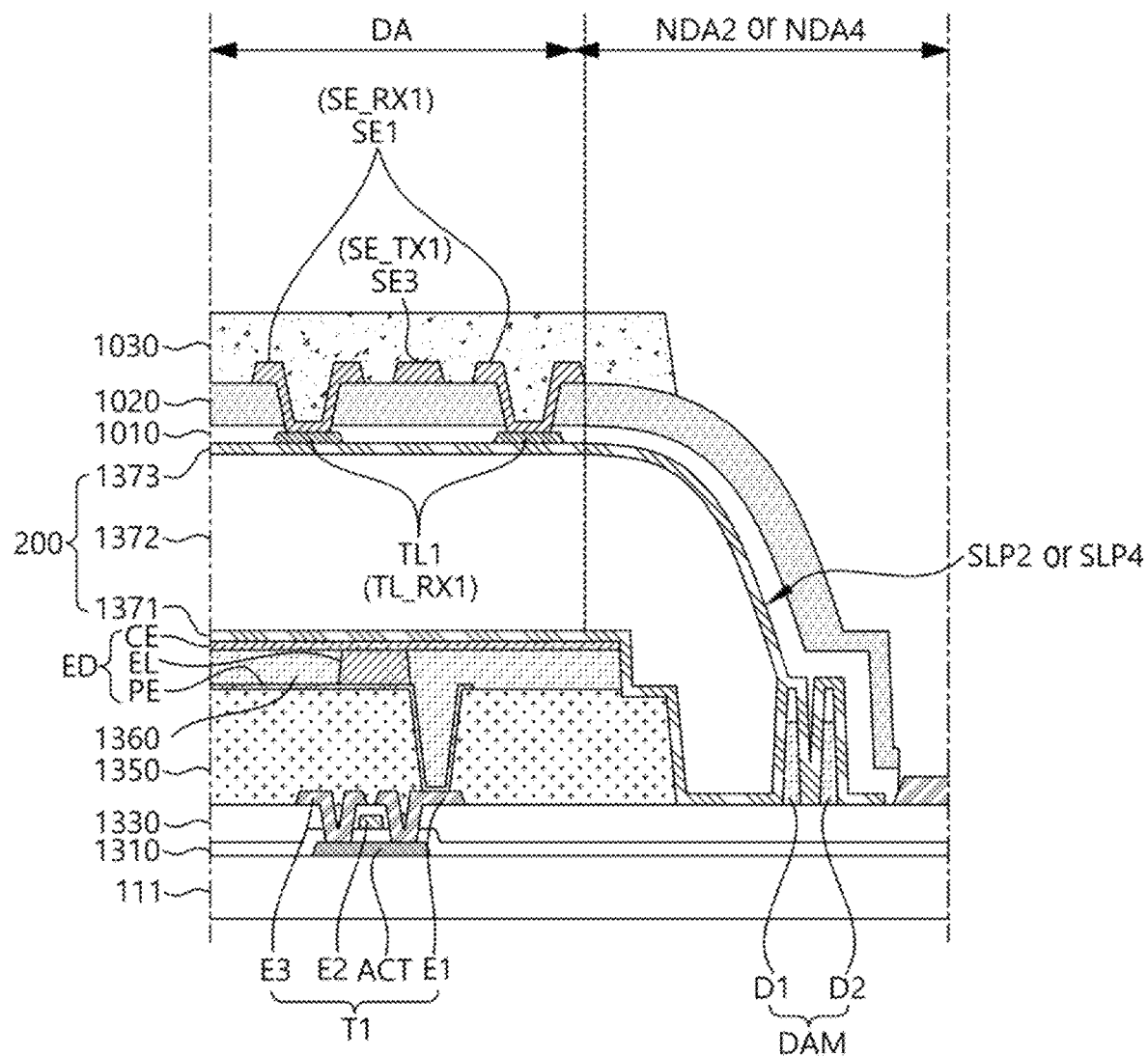

FIGS. 13 to 15 are cross-sectional views illustrating main points of the display panel 110 of FIG. 12. When described with reference to FIGS. 13 to 15, FIGS. 2A and 3 are also referred to.

FIG. 13 is a vertical cross-sectional structure of a portion of the display area DA and the first non-display area NDA1, illustrating a vertical cross-sectional structure of a portion of the third sensor electrode SE3 and an area in which the third touch routing line TL3 is disposed. FIG. 14 is a vertical cross-sectional structure of a portion of the display area DA and the first non-display area NDA1, illustrating a vertical cross-sectional structure of a portion of the fourth sensor electrode SE4 and an area in which the fourth touch routing line TL4 is disposed. FIG. 15 is a vertical cross-sectional structure of a portion of the display area DA and the first non-display area NDA1, illustrating a vertical cross-sectional structure of a portion of the first sensor electrode SE1 and an area in which the first touch routing line TL1 is disposed.

Referring to FIGS. 13 and 14, a substrate 111 can include a display area DA and a first non-display area NDA1, which is an outer area of the display area DA in the first direction, and the first non-display area NDA1 can include a bending area BA and a pad area PA.

Referring to FIG. 15, the substrate 111 can further include a second non-display area NDA2 that is an outer area of the display area DA in the second direction or a fourth non-display area NDA4 that is an outer area of the display area DA in a direction opposite to the second direction. The second non-display area NDA2 and the fourth non-display area NDA4 do not include the bending area BA and the pad area PA.

Referring to FIGS. 13 to 15, a first transistor T1 can be disposed on the substrate 111. The first transistor T1 can include a first electrode E1, a second electrode E2, a third electrode E3, and an active layer ACT. The second electrode E2 can be a gate electrode, the first electrode E1 can be a source electrode or a drain electrode, and the third electrode E3 can be a drain electrode or a source electrode.

For example, when the first transistor T1 has a coplanar structure, the active layer ACT can be disposed on the substrate 111, the gate insulation film 1310 can be disposed on the active layer ACT, and the second electrode E2 corresponding to the gate electrode can be disposed on the gate insulation film 1310. An interlayer insulation film 1330 can be disposed on the second electrode E2. The first electrode E1 and the third electrode E3 can be disposed on the interlayer insulation film 1330. The first electrode E1 can be connected to a portion of the active layer ACT through a contact hole of the interlayer insulation film 1330. The third electrode E3 can be connected to another portion of the active layer ACT through another contact hole of the interlayer insulation film 1330.

A planarization film 1350 can be disposed on the first transistor T1.

Referring to FIGS. 13 to 15, the light emitting element ED including the pixel electrode PE, the element intermediate layer EL, and the common electrode CE can be formed on the planarization film 1350.

The pixel electrode PE can be disposed on the planarization film 1350. The pixel electrode PE can be connected to the first electrode E1 of the first transistor T1 through a contact hole of the planarization film 1350.

A bank 1360 can be disposed on the pixel electrode PE. The bank 1360 can have an opening in an area in which a light emitting area of the light emitting element ED of the subpixel SP should be formed.

A portion of the element intermediate layer EL can be connected to a partial upper surface of the pixel electrode PE through an opening of the bank 1360. The common electrode CE can be disposed on the element intermediate layer EL.

Referring to FIGS. 13 to 15, the encapsulation layer 200 can be disposed on the common electrode CE. The encapsulation layer 200 can be a single film or multiple films.

For example, when the encapsulation layer 200 includes multiple films, the encapsulation layer 200 can have a structure in which an inorganic film and an organic film are alternately stacked. For example, the encapsulation layer 200 can include a first encapsulation layer 1371, a second encapsulation layer 1372, a third encapsulation layer 1373, and the like, and the first encapsulation layer 1371 and the third encapsulation layer 1373 can be inorganic films, and the second encapsulation layer 1372 can be organic films. The second encapsulation layer 1372 can be thicker than the first encapsulation layer 1371 and the third encapsulation layer 1373.

The encapsulation layer 200 can extend from the display area DA to a partial area of the first non-display area NDA1.

The first encapsulation layer 1371 can be disposed on the common electrode CE, and the first encapsulation layer 1371 can be disposed to cover the common electrode CE. The first encapsulation layer 1371 can extend to the first non-display area NDA to cover at least one dam D1 and D2. The first encapsulation layer 1371 can extend to the pad area PA disposed outside the at least one dam D1 and D2 to overlap with the pad PD4.

The second encapsulation layer 1372 can be disposed on the first encapsulation layer 1371. The second encapsulation layer 1372 can be formed to have a sufficient thickness to prevent foreign substances (particles) from penetrating into the common electrode CE and the element intermediate layer EL including an organic material through the first encapsulation layer 1371. The second encapsulation layer 1372 can be formed through a curing process after being applied in a liquid form through an inkjet process.

The third encapsulation layer 1373 can be disposed on the second encapsulation layer 1372. The third encapsulation layer 1373 can be disposed to cover the second encapsulation layer 1372. The third encapsulation layer 1373 can cover the second encapsulation layer 1372, and can extend to the first non-display area NDA1 to cover at least one dam D1 and D2. Further, the third encapsulation layer 1373 can extend to the pad area PA disposed outside the at least one dam D1 and D2 to overlap the pad PD3. In this situation, the first encapsulation layer 1371 and the third encapsulation layer 1373 can be formed to have the same end position.

For example, each of the first encapsulation layer 1371 and the third encapsulation layer 1373 can be formed of silicon nitride, aluminum nitride, zirconium nitride, titanium nitride, hafnium nitride, tantalum nitride, silicon oxide, aluminum oxide, or titanium oxide.

For example, the second encapsulation layer 1372 can be formed of an acrylic resin, an epoxy resin, a phenolic resin, a polyamide resin, or a polyimide resin.

Referring to FIGS. 13 to 15, a touch sensor can be formed on the encapsulation layer 200. The touch sensor forming layer on the encapsulation layer 200 can include a touch buffer film 1000, a jumping metal layer JML, a first touch interlayer insulation film 1010, a bridge metal layer BML, a second touch interlayer insulation film 1020, a sensor metal layer SML, and a touch protective film 1030.

To form a touch sensor, the touch buffer film 1000 can be disposed on the encapsulation layer 200 as illustrated in FIGS. 10 and 11, and the touch buffer film 1000 can be omitted on the encapsulation layer 200 as illustrated in FIGS. 13 to 15.

The metal layer directly above the touch buffer film 1000 and the encapsulation layer 200 can be the jumping metal layer JML. The insulation film directly above the jumping metal layer JML can be the first touch interlayer insulation film 1010. The metal layer directly above the first touch interlayer insulation film 1010 can be the bridge metal layer BML. The insulation film directly above the bridge metal layer BML can be the second touch interlayer insulation film 1020. The metal layer directly above the second touch interlayer insulation film 1020 can be the sensor metal layer SML.

As described above with reference to FIG. 12, the n or more reception touch routing lines TL_RX1 to TL_RXn are disposed to extend to the pad area PA without passing through the first touch routing area TRA1 in the first non-display area NDA1, and thus the n or more reception touch routing lines TL_RX1 to TL_RXn may not overlap with the m or more transmission touch routing lines TL_TX1 to TL_TXm disposed in the first touch routing area TRA1.

The first touch interlayer insulation film 1010 can be formed of an inorganic film. Alternatively, the first touch interlayer insulation film 1010 can be formed of an organic film. The inorganic film can have a thickness smaller than that of the organic film.

Similarly, the second touch interlayer insulation film 1020 can be an inorganic film or an organic film.

When the first touch interlayer insulation film 1010 and/or the second touch interlayer insulation film 1020 is formed of an inorganic film, the inorganic film can be formed of silicon nitride, aluminum nitride, zirconium nitride, titanium nitride, hafnium nitride, tantalum nitride, silicon oxide, aluminum oxide, or titanium oxide.

First, referring to FIG. 13, a vertical cross-sectional structure of a portion of the third sensor electrode SE3 and an area in which the third touch routing line TL3 is disposed is described.

Referring to FIG. 13, a mesh-type third sensor electrode SE3 and a mesh-type fourth sensor electrode SE4 can be disposed in the display area DA.

The mesh-type third sensor electrode SE3 and the mesh-type fourth sensor electrode SE4 can be disposed in the sensor metal layer SML to include the sensor metal SM.

In the display area DA, the mesh-type third sensor electrode SE3 can be disposed to extend in the first direction. In the display area DA, the mesh-type fourth sensor electrode SE4 can be disposed to extend in the second direction.

Referring to FIG. 13, the touch protective film 1030 can be disposed on the sensor electrodes SE including the third sensor electrode SE3 and the fourth sensor electrode SE4. The touch protective film 1030 can protect the touch sensor and stabilize the characteristics of the display device 100 by blocking a harmful environment and moisture from the outside. For example, the touch protective film 1030 can be an organic film. The touch protective film 1030 can be disposed to extend to the non-display area NDA.

Referring to FIG. 13, in the display area DA or the first non-display area NDA1, the third touch routing line TL3 electrically connected to the mesh-type third sensor electrode SE3 or integrated with the mesh-type third sensor electrode SE3 can be electrically connected to the third pad PD3 disposed in the pad area PA.

According to the example of FIG. 13, the third sensor electrode SE3 can be the first transmission sensor electrode SE_TX1, the third touch routing line TL3 can be the first transmission touch routing line TL_TX1, and the fourth sensor electrode SE4 can be the nth reception sensor electrode SE_RXn.

Referring to FIG. 13, in the first non-display area NDA1, the third touch routing line TL3 can be disposed along a first inclined surface SLP1 of the encapsulation layer 200.

Referring to FIG. 13, the third touch routing line TL3 can be electrically connected to the third pad PD3 disposed in the pad area PA through a connection pattern 1340a disposed outside the encapsulation layer 200. Here, the connection pattern 1340a can be disposed outside the encapsulation layer 200 and can be disposed on the interlayer insulation film 1330.

The third touch routing line TL3 can be of a single line type or a multi-line type.

For example, when the third touch routing line TL3 is of a single line type, the third touch routing line TL3 can be disposed in the bridge metal layer BML.

For example, as illustrated in FIG. 13, when the third touch routing line TL3 is of a multi-line type, the third touch routing line TL3 can include a third lower sub line TL3a and a third upper sub line TL3b electrically connected to each other. The third lower sub line TL3a can be disposed in the bridge metal layer BML which is the second metal layer, and the third upper sub line TL3b can be disposed in the sensor metal layer SML which is the first metal layer.

Referring to FIG. 13, the third lower sub line TL3a can be disposed on the first touch interlayer insulation film 1010, and the third upper sub line TL3b can be disposed on the second touch interlayer insulation film 1020.

Referring to FIG. 13, the third lower sub line TL3a and the third upper sub line TL3b are disposed below and above the second touch interlayer insulation film 1020 to be separated from each other, but can be electrically connected to each other through contact holes of the second touch interlayer insulation film 1020 in the middle. Accordingly, the resistance of the third touch routing line TL3 can be reduced.

Referring to FIG. 13, at least one of the third lower sub line TL3a and the third upper sub line TL3b can be disposed outside the encapsulation layer 200 in the first non-display area NDA1 and can be electrically connected to a connection pattern 1340a positioned on the interlayer insulation film 1330.

Referring to FIG. 13, the connection pattern 1340a can be disposed across the bending area BA and the pad area PA.

Referring to FIG. 13, the display panel 110 can have a dam area DAM disposed in the non-display area NDA and disposed to surround the display area DA. At least one dam D1 or D2 can be disposed in the dam area DAM.

The at least one dam D1 or D2 can be included in the encapsulation layer 200 and can block the flow of the second encapsulation layer 1372, which can be an organic film. In other words, the at least one dam D1 or D2 can prevent the second encapsulation layer 1372, which can be an organic film, from collapsing. Accordingly, the at least one dam D1 or D2 can prevent the second encapsulation layer 1372, which is an organic film, from being exposed to the outside of the display device 100 or invading the pad area PA.

At least one dam D1 and D2 can be disposed.

The first dam D1 can be disposed near an outer point of the second encapsulation layer 1372 included in the encapsulation layer 200. The first dam D1 can be disposed to surround the outer periphery of the display area DA to primarily block the flow of the second encapsulation layer 1372. Further, the first dam D1 can be disposed between the display area DA and the pad area PA to primarily block the flow of the second encapsulation layer 1372 to prevent the second encapsulation layer 1372 from invading the pad area PA.

The second dam D2 can be disposed to surround the outer periphery of the first dam D1, and can be disposed side by side to be spaced apart from the first dam D1. The second dam D2 can secondarily block the second encapsulation layer 1372 flowing to the outer periphery of the first dam D1. Accordingly, the first dam D1 and the second dam D2 can more effectively block the second encapsulation layer 1372 from being exposed to the outside of the display device 100 or invading the pad area PA.

The at least one dam D1 or D2 can be formed simultaneously with the planarization film 1350 or the bank 1360, and can be formed of the same material as the planarization film 1350 or the bank 1360. In this situation, the at least one dam D1 or D2 can be formed of an organic material such as an acrylic resin, an epoxy resin, a phenolic resin, a polyamide resin, a polyimide resin, or the like.

The third touch routing line TL3 can be formed to extend from the encapsulation layer 200 to the upper portion of the at least one dam D1 and D2, and can be electrically connected to the connection pattern 1340a disposed below by a contact hole of the second touch interlayer insulation film 1020. Accordingly, the third touch routing line TL3 may be absent in the bending area BA.

Referring to FIG. 13, the bending area BA can include a bending film 1351 on the substrate 111, and a connection pattern 1340a electrically connecting the third touch routing line TL3 extending between the encapsulation layer 200 and the bending film 1351 with the third pad PD3 disposed in the pad area PA. The connection pattern 1340a can be positioned between the substrate 111 and the bending film 1351.

The third touch routing line TL3 can be electrically connected to the third pad PD3 in the pad area PA through the connection pattern 1340a. Here, the touch driving circuit 160 can be directly or indirectly connected to the third pad PD3.

The third pad PD3 can be disposed on at least one of the sensor metal layer SML, the bridge metal layer BML, and the jumping metal layer JML.

The connection pattern 1340a can be disposed on a fourth metal layer different from the sensor metal layer SML, the bridge metal layer BML, and the jumping metal layer JML. Here, the transistor included in each of the plurality of subpixels SP includes a source electrode, a drain electrode, and a gate electrode, and the fourth metal layer can include at least one of a gate metal layer on which the gate electrode is disposed and a source-drain metal layer on which the source electrode and the drain electrode are disposed.

For example, the connection pattern 1340a can be a single connection pattern including the same material as the source-drain electrode of the first transistor T1. Alternatively, the connection pattern 1340a can include a first connection pattern including the same material as the source-drain electrode of the first transistor T1 and a second connection pattern including the same material as the gate electrode of the first transistor T1 or the gate line GL. Here, the first connection pattern and the second connection pattern, respectively, can be disposed above and below the interlayer insulation film 1330, and can be electrically connected through a contact hole of the interlayer insulation film 1330.

A bending film 1351 can be disposed on a portion of the connection pattern 1340a.

The bending film 1351 can be disposed in the bending area BA, disposed between the dams D1 and D2 and the pad PD4, disposed between the dams D1 and D2 and the pad PD3, and disposed to cover an upper portion of the connection pattern 1340a. The bending film 1351 can prevent and protect the connection pattern 1340a from being exposed to the outside in the bending area BA in which the substrate 111 is bent. Further, the bending film 1351 can be provided with an open hole OH through which an upper surface thereof is exposed. In other words, the open hole OH can be formed by removing inorganic films (e.g., the first encapsulation layer 1371, the third encapsulation layer 1373, and the second touch interlayer insulation film 1020) that can be disposed on the bending film 1351. When the inorganic film is disposed on the bending film 1351 and the bending area BA is bent, a crack can occur in the inorganic film, and moisture or the like can penetrate the inorganic film through the crack. Thus, the inorganic films provided on the bending film 1351 are removed.

A pattern protective film covering a portion of the connection pattern 1340*a* can further be present. The pattern protective film can be disposed to surround an end of the connection pattern 1340*a*. The pattern protective film can protect an end of the connection pattern 1340*a* disposed at an edge of the first non-display area NDA1.

The bending film 1351 and the pattern protective film can be disposed on the same layer as the planarization film 1350 and can be formed of the same material. For example, the planarization film 1350, the bending film 1351, and the pattern protection film can be formed of an organic film such as an acrylic resin, an epoxy resin, a phenolic resin, a polyamide resin, a polyimide resin, or the like.

In the pad area PA, the third pad PD3 can be electrically connected to the connection pattern 1340*a* through a pad contact hole penetrating the first encapsulation layer 1371, the third encapsulation layer 1373, and the second touch interlayer insulation film 1020.

Next, referring to FIG. 14, a vertical cross-sectional structure of a portion of the fourth sensor electrode SE4 and an area in which the fourth touch routing line TL4 is disposed is described. A description of the same structural feature as in FIG. 13 can be omitted.

Referring to FIG. 14, a mesh-type fourth sensor electrode SE4 and a mesh-type third sensor electrode SE3 can be disposed in the display area DA.

The mesh-type fourth sensor electrode SE4 and the mesh-type fourth sensor electrode SE3 can be disposed in the sensor metal layer SML to include the sensor metal SM.

In the display area DA, the mesh-type third sensor electrode SE3 can be disposed to extend in the first direction. In the display area DA, the mesh-type fourth sensor electrode SE4 can be disposed to extend in the second direction.

Referring to FIG. 14, in the display area DA or the first non-display area NDA1, the fourth touch routing line TL4 electrically connected to the mesh-type fourth sensor electrode SE4 can be electrically connected to the fourth pad PD4 disposed in the pad area PA.

According to the example of FIG. 14, the fourth sensor electrode SE4 can be the nth reception sensor electrode SE_RXn, the fourth touch routing line TL4 can be the nth reception touch routing line TL_RXn, and the third sensor electrode SE3 can be the first transmission sensor electrode SE_TX1.

The fourth sensor electrode SE4 illustrated in FIG. 14 can be a plurality of fourth sub sensor electrodes SUB disposed in the sensor metal layer SML. In the display area DA, the fourth sensor electrode SE4 can be electrically connected to the fourth touch routing line TL4.

Referring to FIG. 14, in the display area DA, the fourth touch routing line TL4, connected to the plurality of fourth sub sensor electrodes SUB disposed in the sensor metal layer SML, which is the first metal layer included in the fourth sensor electrode SE4, can be the fourth lower sub line TL4*a* disposed in the jumping metal layer JML, which is the third metal layer.

Referring to FIG. 14, the fourth lower sub line TL4*a* can be disposed on the encapsulation layer 200 or the touch buffer film 1000, and can be disposed under the first touch interlayer insulation film 1010.

Referring to FIG. 14, in the display area DA, the plurality of fourth sub sensor electrodes SUB of the fourth sensor electrode SE4 can be electrically connected to the fourth lower sub line TL4*a* of the fourth touch routing line TL4 through a contact hole of the first touch interlayer insulation film 1010 and the second touch interlayer insulation film 1020.

Referring to FIG. 14, the fourth lower sub line TL4*a* of the fourth touch routing line TL4 disposed in the display area DA can extend to the first non-display area NDA1.

The fourth lower sub line TL4*a* of the fourth touch routing line TL4 extending to the first non-display area NDA1 can descend along the first inclined surface SLP1 of the encapsulation layer 200 to be electrically connected to the connection pattern 1340*b*.

The connection pattern 1340*b* can be disposed in the bending area BA and the pad area PA in the first non-display area NDA1.

In the first non-display area NDA1, the fourth touch routing line TL4 can be of a single line type or a multi-line type.

For example, when the fourth touch routing line TL4 is of a single line type in the first non-display area NDA1, the fourth touch routing line TL4 can be disposed in the jumping metal layer JML in the first non-display area NDA1.

For example, in the first non-display area NDA1, when the fourth touch routing line TL4 is of a multi-line type, the fourth touch routing line TL4 can include a fourth lower sub line TL4*a* and a fourth upper sub line TL4*b* electrically connected to each other.

The fourth lower sub line TL4*a* can be disposed in the jumping metal layer JML, which is the third metal layer, and the fourth upper sub line TL4*b* can be disposed in the sensor metal layer SML, which is the first metal layer.

On the first inclined surface SLP1 of the encapsulation layer 200, the fourth lower sub line TL4*a* and the fourth upper sub line TL4*b* constituting the fourth touch routing line TL4 can be electrically connected through at least one contact hole of the first touch interlayer insulation film 1010 and the second touch interlayer insulation film 1020.

At least one of the fourth lower sub line TL4*a* and the fourth upper sub line TL4*b* constituting the fourth touch routing line TL4 can be electrically connected to the fourth pad PD4 in the pad area PA through the connection pattern 1340*b*. Here, the touch driving circuit 160 can be directly or indirectly connected to the fourth pad PD4.

The fourth pad PD4 can be disposed on at least one of the sensor metal layer SML, the bridge metal layer BML, and the jumping metal layer JML.

The fourth touch routing line TL4 can be formed to extend from the encapsulation layer 200 to the upper portion of the at least one dam D1 and D2, and can be electrically connected to the connection pattern 1340*a* disposed below by a contact hole of the second touch interlayer insulation film 1020. Accordingly, the fourth touch routing line TL4 may be absent in the bending area BA.

Referring to FIG. 14, the bending area BA can include a bending film 1351 on the substrate 111, and a connection pattern 1340*b* electrically connecting the fourth touch routing line TL4 extending between the encapsulation layer 200 and the bending film 1351 with the fourth pad PD4 disposed in the pad area PA. The connection pattern 1340*b* can be positioned between the substrate 111 and the bending film 1351.

Next, referring to FIG. 15, an internal touch routing structure is described. To that end, a vertical cross-sectional structure of a portion of the first sensor electrode SE1 and an area in which the first touch routing line TL1 is disposed is described. A description of the same structural feature as in FIGS. 13 and 14 can be omitted.

Referring to FIG. 15, a mesh-type first sensor electrode SE1 and a mesh-type third sensor electrode SE3 can be disposed in the display area DA.

The mesh-type first sensor electrode SE1 and the mesh-type third sensor electrode SE3 can be disposed in the sensor metal layer SML to include the sensor metal SM.

In the display area DA, the mesh-type third sensor electrode SE3 can be disposed to extend in the first direction. In the display area DA, the mesh-type first sensor electrode SE1 can be disposed to extend in the second direction.

Referring to FIG. 15, in the display area DA, the first touch routing line TL1 electrically connected to the mesh-type first sensor electrode SE1 can be disposed to extend in the first direction.

The first touch routing line TL1 can be disposed to extend to the first non-display area NDA1 through the display area DA in the first direction without passing through the second non-display area NDA2 positioned outside the display area DA in the second direction and the fourth non-display area NDA4 positioned outside the display area DA in the direction opposite to the second direction. Accordingly, the size of the second non-display area NDA2, which is the right bezel area, and the size of the fourth non-display area NDA4, which is the left bezel area, can be significantly reduced.

The first touch routing line TL1 can extend to the first non-display area NDA1 and can be electrically connected to the first pad PD1 disposed in the pad area PA in the first non-display area NDA1.

According to the example of FIG. 15, the first sensor electrode SE1 can be the first reception sensor electrode SE_RX1, the first touch routing line TL1 can be the first reception touch routing line TL_RX1, and the third sensor electrode SE3 can be the first transmission sensor electrode SE_TX1.

The first sensor electrode SE1 illustrated in FIG. 15 can be a plurality of first sub sensor electrodes SUB disposed in the sensor metal layer SML. In the display area DA, the first sensor electrode SE1 can be electrically connected to the first touch routing line TL1.

Referring to FIG. 15, in the display area DA, the first touch routing line TL1, connected to the plurality of first sub sensor electrodes SUB disposed in the sensor metal layer SML, which is the first metal layer included in the first sensor electrode SE1, can be the first lower sub line disposed in the jumping metal layer JML, which is the third metal layer.

The first touch routing line TL1 can be configured and disposed in the same manner as the fourth touch routing line TL4 illustrated in FIG. 14.

The first touch routing line TL1 can be of a single line type or a multi-line type.

For example, when the first touch routing line TL1 is of a single line type, the first touch routing line TL1 can be disposed in the jumping metal layer JML.

For example, when the first touch routing line TL1 is of a multi-line type, the first touch routing line TL1 can include a first lower sub line and a first upper sub line that are electrically connected to each other. The first lower sub line can be disposed in the jumping metal layer JML, which is the third metal layer, and the first upper sub line can be disposed in the sensor metal layer SML, which is the first metal layer.

In the first non-display area NDA1, the first touch routing line TL1 can be electrically connected to the first pad PD1 disposed in the pad area PA through a connection pattern.

As illustrated in FIG. 15, according to the internal touch routing structure according to one or more embodiments of the disclosure, touch routing lines are not disposed in the second non-display area NDA2 positioned outside the display area DA in the second direction (e.g., the right outer periphery of the display area DA) and the fourth non-display area NDA4 positioned outside the display area DA in the direction opposite to the second direction (e.g., the left outer periphery of the display area DA). Accordingly, the size of the second non-display area NDA2, which is the right bezel area, and the size of the fourth non-display area NDA4, which is the left bezel area, can be significantly reduced.

Figure 16:
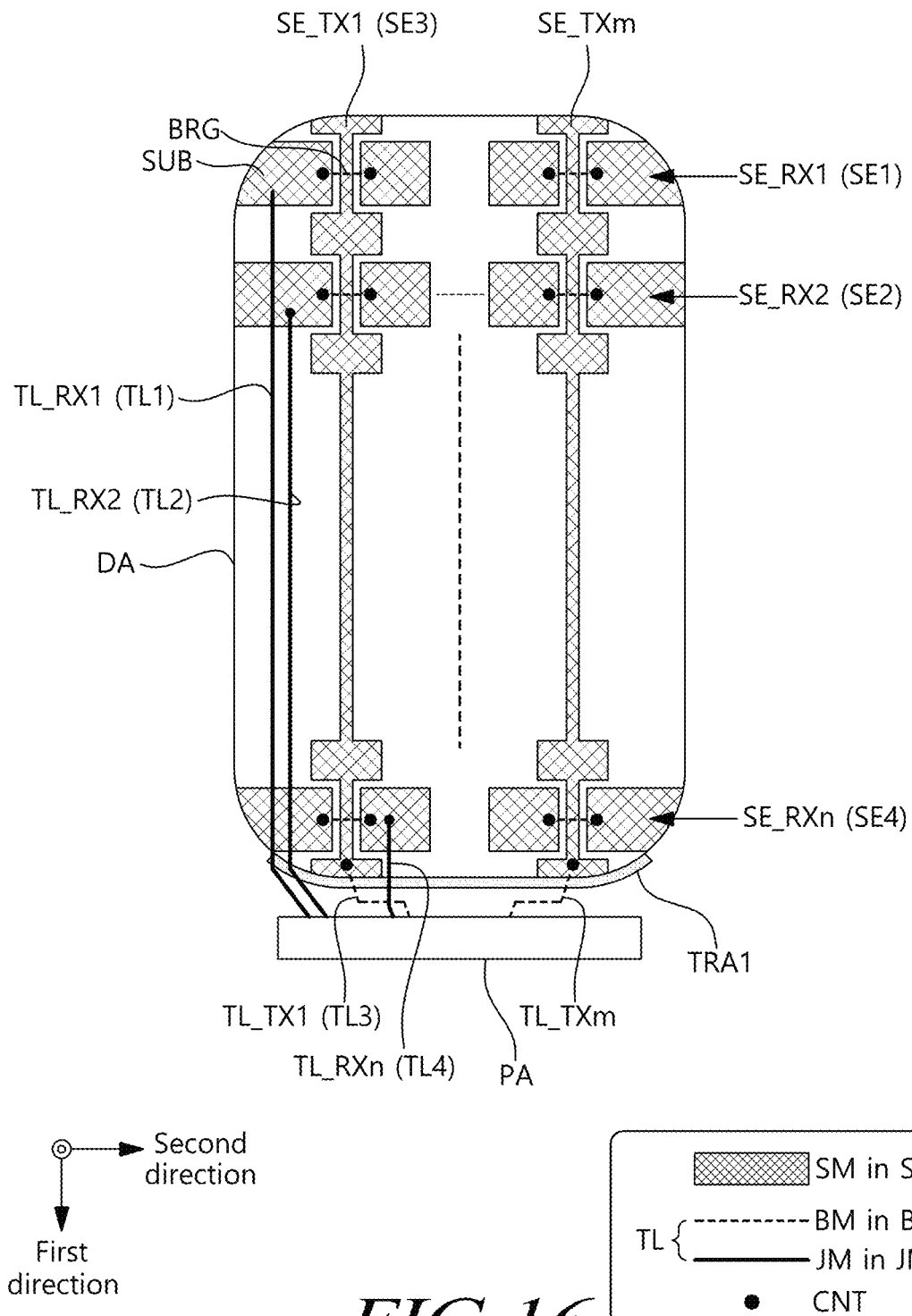
FIG. 16 is a plan view illustrating a display panel according to one or more embodiments of the disclosure.
Figure 17:
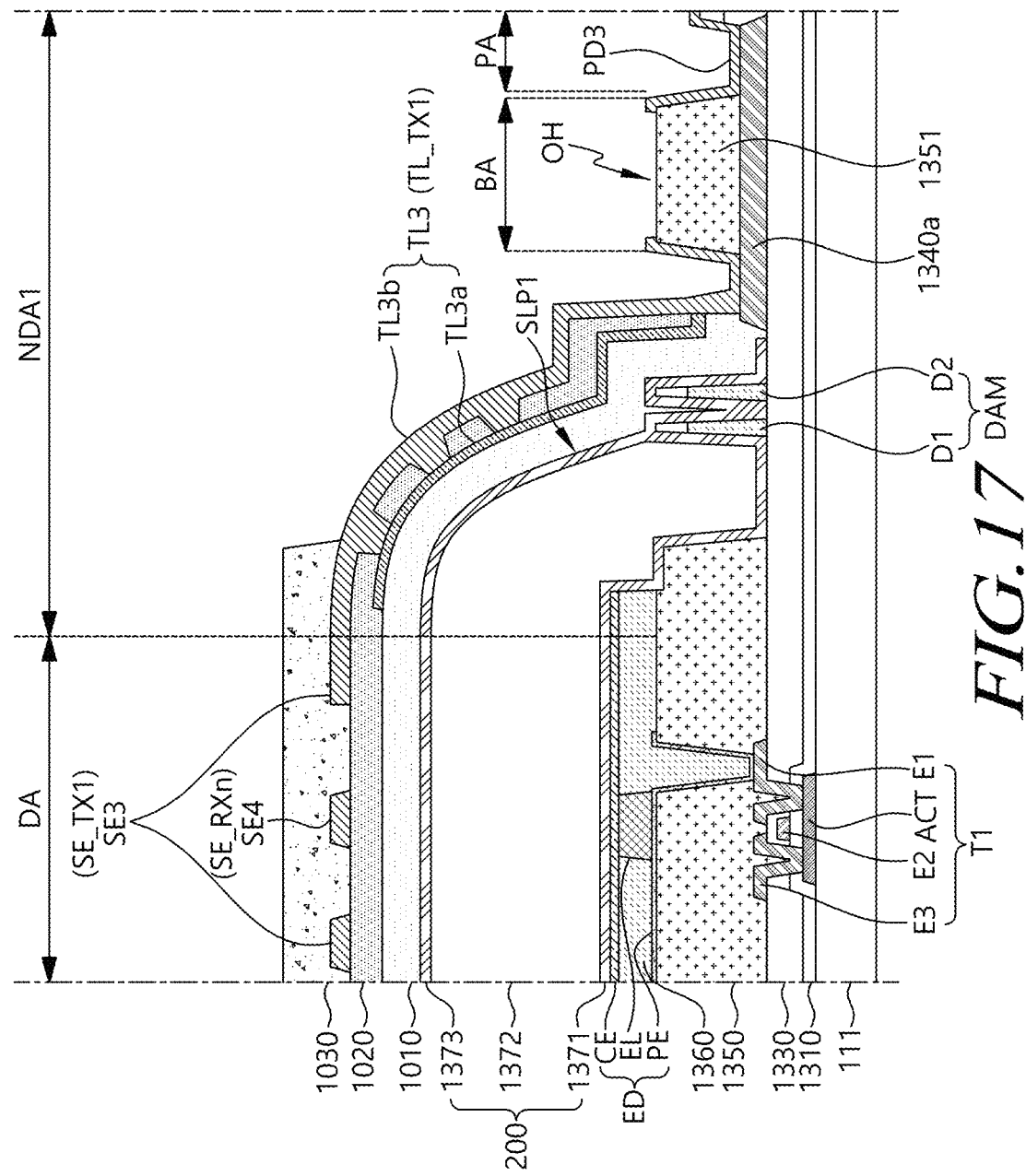
FIGS. 17, 18, and 19 are cross-sectional views illustrating aspects of a display panel according to one or more embodiments of the disclosure.
Figure 18:
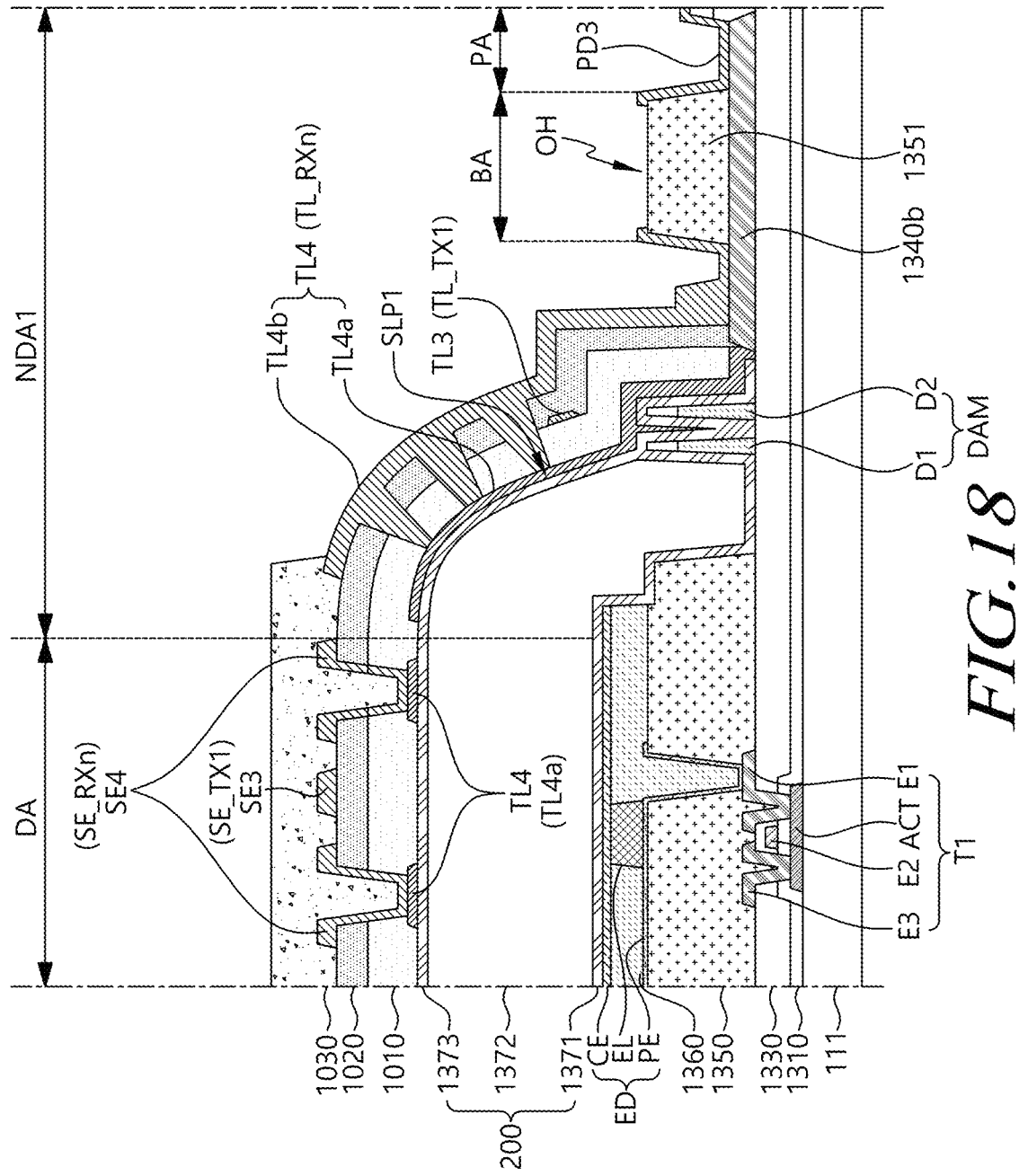
Figure 19:
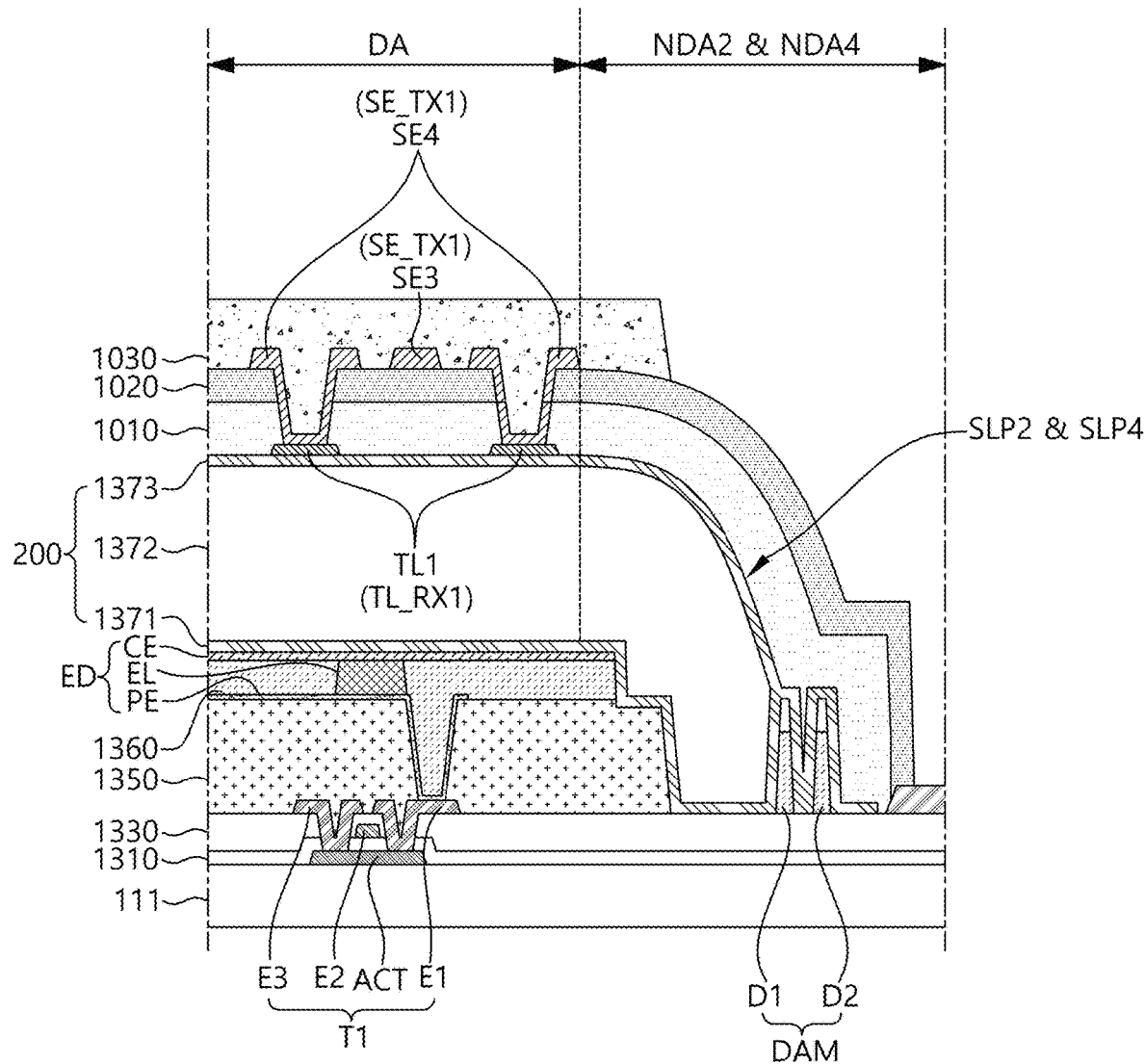

FIG. 16 is a plan view of a display panel 110 according to one or more embodiments of the disclosure, and FIGS. 17 to 19 are cross-sectional views of main points of the display panel 110 of FIG. 16.

FIG. 16 is a plan view illustrating an embodiment different from that of FIG. 12, and FIGS. 17 to 19 are cross-sectional views illustrating embodiments different from those of FIGS. 13 to 15.

Referring to FIG. 16, the n or more reception touch routing lines TL_RX1 to TL_RXn can extend to the pad area PA in the first non-display area NDA1 across the display area DA in the first direction without passing through the second non-display area NDA2 and the fourth non-display area NDA4.

Referring to FIG. 16, unlike FIG. 12, some of the contact holes CNTs where the n or more reception touch routing lines TL_RX1 to TL_RXn and the n reception sensor electrodes SE_RX1 to SE_RXn are connected can be positioned farther out from the first transmission sensor electrode SE_TX1 disposed at the outermost periphery among the m transmission sensor electrodes SE_TX1 to SE_TXm. However, others of the contact holes CNTs where the n or more reception touch routing lines TL_RX1 to TL_RXn and the n reception sensor electrodes SE_RX1 to SE_RXn are connected can be positioned farther in from the first transmission sensor electrode SE_TX1 disposed at the outermost periphery among the m transmission sensor electrodes SE_TX1 to SE_TXm. For example, as illustrated in FIG. 16, the contact hole connecting the first reception touch routing line TL_RX1 and the first reception sensor electrode SE_RX1 can be positioned toward NDA4 from the first transmission sensor electrode SE_TX1. Similarly, the contact hole connecting the second reception touch routing line TL_RX2 and the second reception sensor electrode SE_RX2 can be positioned toward NDA4 from the first transmission sensor electrode SE_TX1. However, the contact hole connecting the nth reception touch routing line TL_RXn and the nth reception sensor electrode SE_RXn can be positioned toward NDA2 from the first transmission sensor electrode SE_TX1.

Accordingly, as illustrated in FIG. 16, at least some of the n or more reception touch routing lines TL_RX1 to TL_RXn can be disposed to extend to the pad area PA through the first touch routing area TRA1 in the first non-display area NDA1. For example, as illustrated in FIG. 16, the nth reception touch routing line TL_RXn can be disposed to extend to the pad area PA through the first touch routing area TRA1 in the first non-display area NDA1. Also, one or more of the reception touch routing lines TL_RX can overlap with one or more of the transmission touch routing lines TL_TX, in the first touch routing area TRA1 in the first non-display area NDA1.

In the first non-display area NDA1, at least some of the n or more reception touch routing lines TL_RX1 to TL_RXn can overlap with the m or more transmission touch routing lines TL_TX1 to TL_TXm disposed in the first touch routing area TRA1. For example, as illustrated in FIG. 16, the nth reception touch routing line TL_RXn can overlap with the first transmission touch routing line TL_TX1.

As such, in the first non-display area NDA1, noise (e.g., parasitic capacitance) can occur between the reception touch routing line TL_RX and the transmission touch routing line TL_TX overlapping with each other.

In the display panel 110 according to one or more embodiments of the disclosure, in order to reduce noise between the reception touch routing line TL_RX and the transmission touch routing line TL_TX overlapping with each other, the first touch interlayer insulation film 1010 positioned between the reception touch routing line (a sub line disposed in the jumping metal layer JML) and the transmission touch routing line (a sub line disposed in the bridge metal layer BML) in the first non-display area NDA1 can be configured as an insulation film for removing noise.

Accordingly, the first touch interlayer insulation film 1010 can include an organic film.

For example, the first touch interlayer insulation film 1010 can be formed of silicon nitride, aluminum nitride, zirconium nitride, titanium nitride, hafnium nitride, tantalum nitride, silicon oxide, aluminum oxide, or titanium oxide.

The vertical cross-sectional structure illustrated in FIG. 17 is the same as the vertical cross-sectional structure illustrated in FIG. 13. However, the first touch interlayer insulation film 1010 illustrated in FIG. 17 is formed of an organic film, and the first touch interlayer insulation film 1010 illustrated in FIG. 13 is formed of an inorganic film.

The vertical cross-sectional structure illustrated in FIG. 18 is the same as the vertical cross-sectional structure illustrated in FIG. 14. However, the first touch interlayer insulation film 1010 illustrated in FIG. 18 is formed of an organic film, and the first touch interlayer insulation film 1010 illustrated in FIG. 14 is formed of an inorganic film.

The vertical cross-sectional structure illustrated in FIG. 19 is the same as the vertical cross-sectional structure illustrated in FIG. 15. However, the first touch interlayer insulation film 1010 illustrated in FIG. 19 is formed of an organic film, and the first touch interlayer insulation film 1010 illustrated in FIG. 15 is formed of an inorganic film.

Referring to FIG. 18, in the first non-display area NDA1, the third lower sub line TL3a of the third touch routing line TL3, which is the first reception touch routing line TL_TX1, can be present between the fourth lower sub line TL4a and the fourth upper sub line TL4b constituting the fourth touch routing line TL4.

In other words, in the first non-display area NDA1, at least one of the fourth lower sub line TL4a and the fourth upper sub line TL4b constituting the fourth touch routing line TL4 can overlap the third lower sub line TL3a of the third touch routing line TL3, which is the first transmission touch routing line TL_TX1.

In other words, in the first non-display area NDA1, the fourth touch routing line TL4, which is the nth reception touch routing line TL_RXn, and the third touch routing line TL3, which is the first transmission touch routing line TL_TX1, can overlap with each other.

However, in the first non-display area NDA1, the first touch interlayer insulation film 1010 positioned between the fourth touch routing line TL4, which is the nth reception touch routing line TL_RXn, and the third touch routing line TL3, which is the first transmission touch routing line TL_TX1, is configured as an insulation film for noise removal, and thus noise between the fourth touch routing line TL4, which is the nth reception touch routing line TL_RXn, and the first transmission touch routing line TL_TX1 can be reduced.

Figure 20:
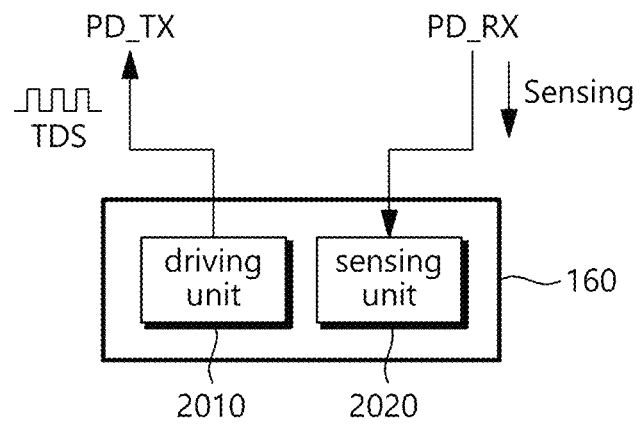
FIG. 20 illustrates a touch driving circuit according to one or more embodiments of the disclosure.

FIG. 20 illustrates a touch driving circuit according to one or more embodiments of the disclosure.

Referring to FIG. 20, the touch driving circuit 160 according to one or more embodiments of the disclosure can include a driving unit 2010 configured to output a touch driving signal TDS whose voltage level changes to at least one of the plurality of transmission pads PD_TX and a sensing unit 2020 configured to sense at least one of the plurality of reception pads PD_RX.

For example, the driving unit 2010 can include an output buffer including an amplifier or the like.

For example, the sensing unit 2020 can include at least one charge amplifier including an operational amplifier and a feedback capacitor, and an analog-to-digital converter. For example, the sensing unit 2020 can further include at least one integrator for integrating the output signals of at least one charge amplifier.

For example, the sensing unit 2020 can further include a first selection circuit for selecting at least one of a plurality of transmission pads PD_TX. The first selection circuit can include a switch circuit, a multiplexer circuit, or the like.

For example, the sensing unit 2020 can further include a sample and hold circuit for storing a plurality of integral values output from the plurality of integrators, and a second selection circuit for selecting at least one of the plurality of integral values stored in the sample and hold circuit and providing the selected integral value to an analog-to-digital converter. The second selection circuit can include a switch circuit, a multiplexer circuit, or the like.

The touch driving circuit 160 can further include a signal generator for generating the touch driving signal TDS.

Figure 21:
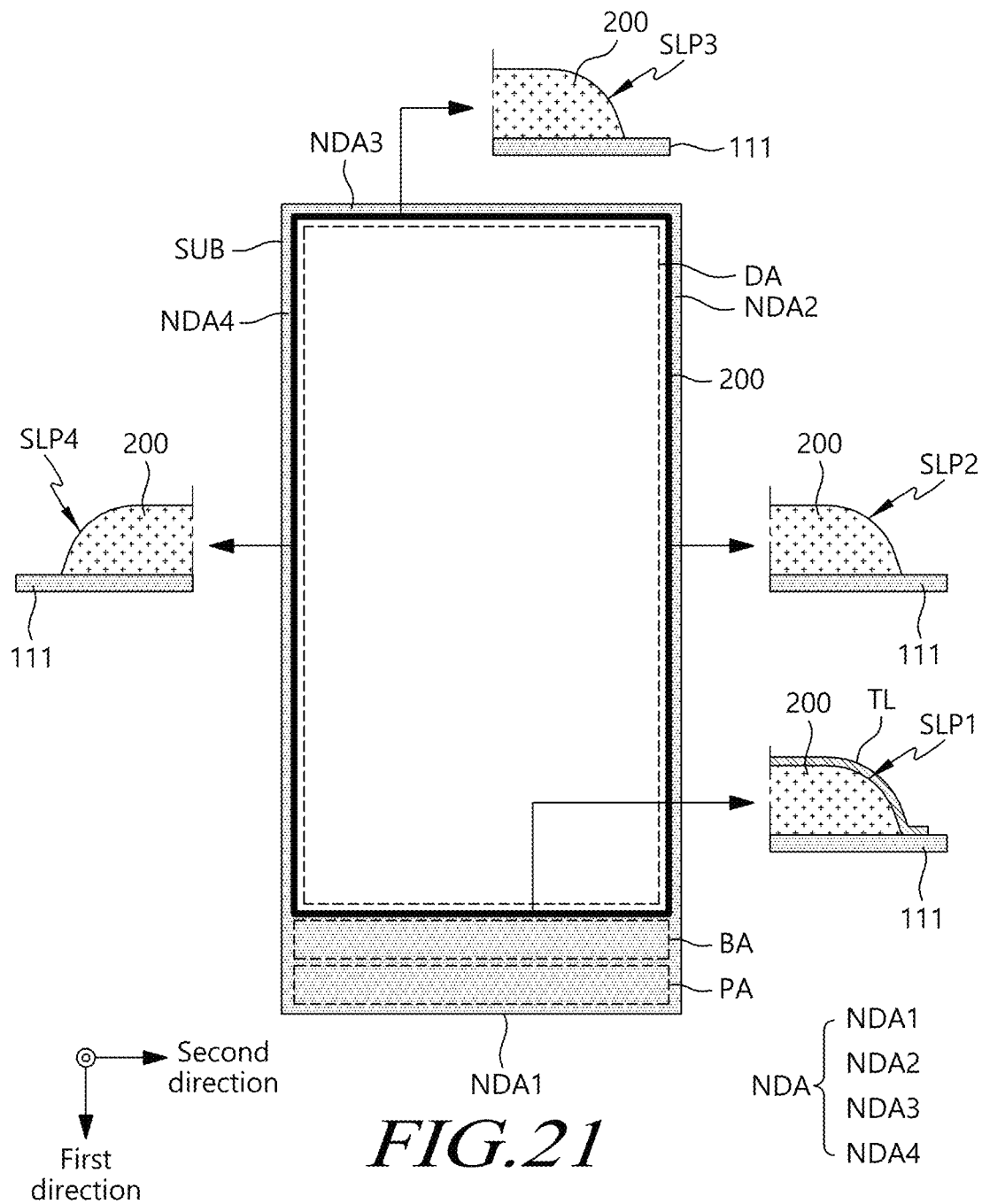
FIG. 21 illustrates a substrate and an encapsulation layer of a display panel according to one or more embodiments of the disclosure.

FIG. 21 illustrates a substrate 111 and an encapsulation layer 200 of a display panel 110 according to one or more embodiments of the disclosure.

Referring to FIG. 21, the non-display area NDA can include a first non-display area NDA1 positioned in the first direction from the display area DA, a second non-display area NDA2 positioned in the second direction from the display area DA, a third non-display area NDA3 positioned in a direction opposite to the first direction from the display area DA, and a fourth non-display area NDA4 positioned in a direction opposite to the second direction from the display area DA.

Referring to FIG. 21, the encapsulation layer 200 can be disposed in the display area DA and can extend to a partial area of the non-display area NDA.

Referring to FIG. 21, the encapsulation layer 200 can include a first inclined surface SLP1 positioned outside in the first direction with respect to a center, a second inclined surface SPL2 positioned outside in the second direction crossing the first direction with respect to the center, a third inclined surface SPP3 positioned outside in a direction opposite to the first direction with respect to the center, and a fourth inclined surface SLP4 positioned outside in a direction opposite to the second direction with respect to the center.

Referring to FIG. 21, the first inclined surface SLP1, the second inclined surface SLP2, the third inclined surface SLP3, and the fourth inclined surface SLP4 of the encapsulation layer 200 can be positioned in the non-display area NDA.

Referring to FIG. 21, among the first inclined surface SLP1, the second inclined surface SLP2, the third inclined surface SLP3, and the fourth inclined surface SLP4 of the encapsulation layer 200, a metal (e.g., a touch routing line) may be absent from the second inclined surface SLP2 and the fourth inclined surface SLP4, and a touch routing line TL disposed to extend in the first direction can be disposed on the first inclined surface SLP1.

For example, the first touch routing line TL1 may be absent from the second inclined surface SLP2 and the fourth inclined surface SLP4, but can descend along the first inclined surface SLP1 to be electrically connected to the second pad PD2 in the pad area PA.

One or more embodiments of the disclosure described above are briefly described below.

A display device according to one or more embodiments of the disclosure can comprise a substrate including a display area in which a plurality of subpixels are disposed and a non-display area including a pad area positioned in a first direction from the display area, a first sensor electrode disposed in the display area and including a plurality of first sub sensor electrodes arranged in a second direction crossing the first direction and at least one first bridge electrically connecting the plurality of first sub sensor electrodes, a first pad disposed in the pad area, and a first touch routing line electrically connecting at least one of the plurality of first sub sensor electrodes and the first pad.

The plurality of first sub sensor electrodes can be disposed in a first metal layer. The first bridge can be disposed in a second metal layer different from the first metal layer.

The first touch routing line can include a metal extending in the first direction in the display area, electrically connected to the first pad, and disposed in a third metal layer different from the first metal layer and the second metal layer.

The first touch routing line can be of a single line type or a multi-line type.

For example, when the first touch routing line is of the single line type, the first touch routing line can include a metal disposed in the third metal layer.

For example, when the first touch routing line is of the multi-line type, the first touch routing line can include a first lower sub line disposed in the third metal layer and a first upper sub line disposed in the first metal layer. Here, the first lower sub line and the first upper sub line can be electrically connected to each other.

The display device according to one or more embodiments of the disclosure can further comprise a second sensor electrode disposed in the display area and including a plurality of second sub sensor electrodes arranged in the second direction and at least one second bridge electrically connecting the plurality of second sub sensor electrodes, a second pad disposed in the pad area, and a second touch routing line electrically connecting at least one of the plurality of second sub sensor electrodes and the second pad.

The second sensor electrode can be disposed closer to the pad area than the first sensor electrode.

The plurality of second sub sensor electrodes can be disposed in the first metal layer. The second bridge can be disposed in the second metal layer.

The second touch routing line can include a metal disposed across the display area in the first direction, electrically connected to the second pad, and disposed in the third metal layer.

The first touch routing line can overlap at least one of the plurality of second sub sensor electrodes.

The display device according to one or more embodiments of the disclosure can further comprise a third sensor electrode disposed in the first direction to pass between two adjacent first sub sensor electrodes among the plurality of first sub sensor electrodes, a third pad disposed in the pad area, and a third touch routing line electrically connecting the third sensor electrode and the third pad.

The third sensor electrode can overlap the first bridge.

The third touch routing line can include a metal disposed in a different metal layer from the first touch routing line. For example, the third touch routing line can include a metal disposed in the second metal layer.

The third touch routing line can be of a single line type or a multi-line type.

For example, when the third touch routing line is of the single line type, the third touch routing line can include a metal disposed in the second metal layer.

For example, when the third touch routing line is of the multi-line type, the third touch routing line can include a third lower sub line disposed in the second metal layer and a third upper sub line disposed in the first metal layer. Here, the third lower sub line and the third upper sub line can be electrically connected to each other.

The third sensor electrode can overlap the first touch routing line.

The display device according to one or more embodiments of the disclosure can further comprise a circuit (which can include a touch driving circuit) connected to the pad area and configured to supply a signal whose voltage level is varied based on the first sensor electrode or the third sensor electrode.

In the display device according to one or more embodiments of the disclosure, the non-display area can include a first non-display area positioned in the first direction from the display area, a second non-display area positioned in the second direction from the display area, a third non-display area positioned in a direction opposite to the first direction from the display area, and a fourth non-display area positioned in a direction opposite to the second direction from the display area.

The pad area can be included in the first non-display area.

The first touch routing line can extend across the display area to the first non-display area without passing the second non-display area and the fourth non-display area.

The display device according to one or more embodiments of the disclosure can further comprise a ground line disposed in the non-display area.

The ground line can be disposed from one point of the pad area to another point of the pad area via the second non-display area, the third non-display area, and the fourth non-display area.

The first non-display area can include a bending area between the display area and the pad area.

The bending area can include a bending film on the substrate and a connection pattern positioned between the substrate and the bending film. The connection pattern can electrically connect the first touch routing line and the first pad.

The first pad can be disposed on at least one of the first metal layer, the second metal layer, and the third metal layer.

The connection pattern can be disposed on a fourth metal layer different from the first metal layer, the second metal layer, and the third metal layer.

For example, when each of the plurality of subpixels includes a transistor including a source electrode, a drain electrode, and a gate electrode, the fourth metal layer where the connection pattern is disposed can include at least one of a gate metal layer on which the gate electrode is disposed and a source-drain metal layer on which the source electrode and the drain electrode are disposed.

The display device according to one or more embodiments of the disclosure can further comprise a light emitting element, an encapsulation layer on the light emitting element, a first touch interlayer insulation film on the encapsulation layer, a second touch interlayer insulation film on the first touch interlayer insulation film, and a touch protective film on the second touch interlayer insulation film.

The third metal layer can be disposed between the encapsulation layer and the first touch interlayer insulation film.

The second metal layer can be disposed between the first touch interlayer insulation film and the second touch interlayer insulation film.

The first metal layer can be disposed between the second touch interlayer insulation film and the touch protective film.

The display device according to one or more embodiments of the disclosure can further comprise a touch buffer film between the encapsulation layer and the first touch interlayer insulation film.

For example, the second touch interlayer insulation film can include an organic film.

For example, the first touch interlayer insulation film can include an inorganic film.

As another example, the first touch interlayer insulation film can include an organic layer.

The encapsulation layer included in the display device according to one or more embodiments of the disclosure can include a first inclined surface positioned outside in the first direction with respect to a center, a second inclined surface positioned outside in the second direction crossing the first direction with respect to the center, a third inclined surface positioned outside in a direction opposite to the first direction with respect to the center, and a fourth inclined surface positioned outside in a direction opposite to the second direction with respect to the center.

The first touch routing line may not be disposed on the second inclined surface and the fourth inclined surface, but can descend along the first inclined surface and be electrically connected to the first pad positioned outside the first inclined surface.

Each of the plurality of first sub sensor electrodes can be disposed in the first metal layer and can include a mesh-type sensor metal having openings.

The first bridge can be disposed in the second metal layer while avoiding at least one of the openings.

The first touch routing line can be disposed in the third metal layer while avoiding at least one of the openings.

A display panel according to one or more embodiments of the disclosure can comprise a substrate including a display area in which a plurality of subpixels are disposed and a non-display area including a pad area positioned in a first direction from the display area, a first touch interlayer insulation film on the substrate, a second touch interlayer insulation film on the first touch interlayer insulation film, a touch protective film on the second touch interlayer insulation film, a first metal layer between the second touch interlayer insulation film and the touch protective film, a second metal layer between the first touch interlayer insulation film and the second touch interlayer insulation film, a third metal layer on the substrate and the first touch interlayer insulation film, a first sensor electrode including a plurality of first sub sensor electrodes disposed in the first metal layer and a first bridge disposed in the second metal layer to electrically connect the plurality of first sub sensor electrodes, and a first touch routing line electrically connected to the first sensor electrode, including a metal disposed in the third metal layer, and extending in the first direction in the display area.

The display panel according to one or more embodiments of the disclosure can further comprise a second sensor electrode including a plurality of second sub sensor electrodes disposed in the first metal layer and a second bridge disposed in the second metal layer to electrically connect the plurality of second sub sensor electrodes, and a second touch routing line electrically connected to the second sensor electrode, including a metal disposed in the third metal layer, and extending in the first direction in the display area.

According to the internal touch routing structure, the first touch routing line can overlap the plurality of second sub sensor electrodes.

The display panel according to one or more embodiments of the disclosure can further comprise a third sensor electrode disposed in the first metal layer, a third touch routing line electrically connected to the third sensor electrode and including a metal disposed in the second metal layer different from the third metal layer, a fourth sensor electrode including a plurality of fourth sub sensor electrodes disposed in the first metal layer and a second bridge disposed in the second metal layer to electrically connect the plurality of fourth sub sensor electrodes, and a fourth touch routing line electrically connected to the fourth sensor electrode, including a metal disposed in the third metal layer, and extending in the first direction in the display area.

The first sensor electrode, the second sensor electrode, and the fourth sensor electrode can cross the third sensor electrode.

For example, the first sensor electrode, the second sensor electrode, and the fourth sensor electrode can be reception sensor electrodes, and the third sensor electrode can be a transmission sensor electrode.

As another example, the first sensor electrode, the second sensor electrode, and the fourth sensor electrode can be transmission sensor electrodes, and the third sensor electrode can be a reception sensor electrode.

The display panel according to one or more embodiments of the disclosure can further comprise a first contact hole where the first sensor electrode and the first touch routing line are connected, and a second contact hole where the fourth sensor electrode and the fourth touch routing line are connected.

For example, the first contact hole and the second contact hole can be both positioned on one side of the third sensor electrode, and the first touch interlayer insulation film can include an inorganic film.

In this situation, the third touch routing line and the fourth touch routing line may not overlap.

As another example, the first contact hole can be positioned on one side of the third sensor electrode, the second contact hole can be positioned on another side of the third sensor electrode, and the first touch interlayer insulation film can include an organic film.

In this situation, the third touch routing line and the fourth touch routing line can overlap.

A display device comprises: a display area including a plurality of subpixels and a non-display area spaced apart from the display area; a plurality of first sensor electrodes disposed in the display area; a plurality of second sensor electrodes disposed in the display area; a plurality of first pads disposed in the non-display area; a plurality of second pads disposed in the non-display area; a plurality of first touch routing lines electrically connecting the plurality of first sensor electrodes with the plurality of first pads; and a plurality of second touch routing lines electrically connecting the plurality of second sensor electrodes with the plurality of second pads.

One of the plurality of first touch routing lines electrically connected to at least one of the plurality of first sensor electrodes overlaps with at least another one of the plurality of first sensor electrodes that is electrically connected to another first touch routing line among the plurality of first touch routing lines.

At least one of the plurality of first touch routing lines can overlap with at least one of the plurality of second touch routing lines in the non-display area.

The non-display area may include: a first bezel area disposed adjacent to a first side of the display area; a second bezel area disposed adjacent to a second side of the display area; a third bezel area disposed adjacent to a third side of the display area; and a fourth bezel area disposed adjacent to a fourth side of the display area.

The plurality of first touch routing lines and the plurality of second touch routing lines pass through the display area and the first bezel area without passing through the second bezel area, the third bezel area, and the fourth bezel area.

The plurality of first pads and the plurality of second pads are disposed only in the first bezel area.

At least one of the plurality of first sensor electrodes is arranged farther away from the first bezel area than another one of the plurality of first sensor electrodes, and a number of the plurality of first touch routing lines electrically connected to the at least one of the plurality of first sensor electrodes is greater than a number of the plurality of first touch routing lines electrically connected to the another one of the plurality of first sensor electrodes.

At least one of the plurality of first touch routing lines may include a lower sub line and an upper sub line, and at least one of the plurality of second touch routing lines may overlap with the lower sub line and the upper sub line.

The display device may further comprise a touch interlayer insulation film disposed between the at least one of the plurality of second touch routing lines and one of the lower sub line and the upper sub line.

The touch interlayer insulation film may include an organic film.

The plurality of first sensor electrodes and the plurality of second sensor electrodes may include mesh-type sensor metals including a plurality of openings corresponding to light emitting areas of some of the plurality of subpixels, and the plurality of first touch routing lines and the plurality of second touch routing lines may do not overlap with the openings in the mesh-type sensor metals.

According to an embodiment of the disclosure, there can be provided a display device and a display panel having a touch sensor structure that allows for a narrow bezel.

According to an embodiment of the disclosure, there can be provided a display device and a display panel including a touch sensor that can provide high touch sensitivity while having a narrow bezel.

According to an embodiment of the disclosure, there can be provided a display device and a display panel including a touch sensor that can reduce noise between sensor electrodes.

According to an embodiment of the disclosure, there can be provided a display device and a display panel having a touch sensor stack structure suitable for reducing the bezel size and increasing touch sensitivity.

According to embodiments of the disclosure, as the bezel size is significantly reduced, the amount of materials used for the reduced bezel size can be reduced. This can help reduce the weight of the display device.

The above-described embodiments are merely examples, and it will be appreciated by one of ordinary skill in the art various changes can be made thereto without departing from the scope of the disclosure. Accordingly, the embodiments set forth herein are provided for illustrative purposes, but not to limit the scope of the disclosure, and should be appreciated that the scope of the disclosure is not limited by the embodiments.

What is claimed is:

1. A display device, comprising:
 a substrate including a display area including a plurality of subpixels and a non-display area including a pad area arranged in an area in a first direction from the display area;
 a first sensor electrode disposed in the display area and including a plurality of first sub sensor electrodes arranged in a second direction crossing the first direction and at least one first bridge electrically connecting the plurality of first sub sensor electrodes;
 a first pad disposed in the pad area;
 a first touch routing line electrically connecting at least one of the plurality of first sub sensor electrodes to the first pad;
 a second sensor electrode disposed in the display area and including a plurality of second sub sensor electrodes arranged in the second direction and at least one second bridge electrically connecting the plurality of second sub sensor electrodes;
 a second pad disposed in the pad area; and
 a second touch routing line electrically connecting at least one of the plurality of second sub sensor electrodes to the second pad,
 wherein the plurality of first sub sensor electrodes are disposed in a first metal layer,
 wherein the first bridge is disposed in a second metal layer different than the first metal layer,
 wherein the first touch routing line extends in the first direction in the display area to electrically connect to the first pad, and the first touch routing line is disposed in a third metal layer different than the first metal layer and the second metal layer,
 wherein the second sensor electrode is disposed closer to the pad area than the first sensor electrode,
 wherein the plurality of second sub sensor electrodes are disposed in the first metal layer,
 wherein the second bridge is disposed in the second metal layer,
 wherein the second touch routing line extends across the display area in the first direction to electrically connect to the second pad, and the second touch routing line is disposed in the third metal layer, and
 wherein the first touch routing line overlaps with at least one of the plurality of second sub sensor electrodes.

2. The display device of claim 1, wherein the first touch routing line is of a single line type and the first touch routing line includes a metal disposed in the third metal layer, or
 wherein the first touch routing line is of a multi-line type and the first touch routing line includes a first lower sub line disposed in the third metal layer and a first upper sub line disposed in the first metal layer, and the first lower sub line and the first upper sub line are electrically connected to each other.

3. The display device of claim 1, further comprising:
 a third sensor electrode extending in the first direction and passing between two adjacent first sub sensor electrodes among the plurality of first sub sensor electrodes;
 a third pad disposed in the pad area; and
 a third touch routing line electrically connecting the third sensor electrode to the third pad,
 wherein the third sensor electrode overlaps with the first bridge.

4. The display device of claim 3, wherein the third touch routing line is of a single line type and the third touch routing line includes a metal disposed in the second metal layer, or wherein the third touch routing line is of a multi-line type and the third touch routing line includes a third lower sub line disposed in the second metal layer and a third upper sub line disposed in the first metal layer, and the third lower sub line and the third upper sub line are electrically connected to each other.

5. The display device of claim 3, wherein the third sensor electrode overlaps with the first touch routing line.

6. A display device, comprising:
a substrate including a display area including a plurality of subpixels and a non-display area including a pad area arranged in an area in a first direction from the display area;
a first sensor electrode disposed in the display area and including a plurality of first sub sensor electrodes arranged in a second direction crossing the first direction and at least one first bridge electrically connecting the plurality of first sub sensor electrodes;
a first pad disposed in the pad area; and
a first touch routing line electrically connecting at least one of the plurality of first sub sensor electrodes to the first pad,
wherein the plurality of first sub sensor electrodes are disposed in a first metal layer,
wherein the first bridge is disposed in a second metal layer different than the first metal layer,
wherein the first touch routing line extends in the first direction in the display area to electrically connect to the first pad, and the first touch routing line is disposed in a third metal layer different than the first metal layer and the second metal layer,
wherein the non-display area includes:
 a first non-display area arranged in the first direction from the display area;
 a second non-display area arranged in the second direction from the display area;
 a third non-display area arranged in a direction opposite to the first direction from the display area; and
 a fourth non-display area arranged in a direction opposite to the second direction from the display area,
wherein the pad area is included in the first non-display area, and
wherein the first touch routing line extends from the display area to the first non-display area without passing through the second non-display area and the fourth non-display area.

7. The display device of claim 6, wherein the first non-display area includes a bending area between the display area and the pad area, wherein the bending area includes:
a bending film disposed on the substrate; and
a connection pattern disposed between the substrate and the bending film to electrically connect the first touch routing line and the first pad, wherein the first pad is disposed in at least one of the first metal layer, the second metal layer, and the third metal layer, and wherein the connection pattern is disposed in a fourth metal layer different than the first metal layer, the second metal layer, and the third metal layer.

8. A display device, comprising:
a substrate including a display area including a plurality of subpixels and a non-display area including a pad area arranged in an area in a first direction from the display area;
a first sensor electrode disposed in the display area and including a plurality of first sub sensor electrodes arranged in a second direction crossing the first direction and at least one first bridge electrically connecting the plurality of first sub sensor electrodes;
a first pad disposed in the pad area;
a first touch routing line electrically connecting at least one of the plurality of first sub sensor electrodes to the first pad;
a light emitting element;
an encapsulation layer disposed on the light emitting element;
a first touch interlayer insulation film disposed on the encapsulation layer;
a second touch interlayer insulation film disposed on the first touch interlayer insulation film; and
a touch protective film disposed on the second touch interlayer insulation film,
wherein the plurality of first sub sensor electrodes are disposed in a first metal layer,
wherein the first bridge is disposed in a second metal layer different than the first metal layer,
wherein the first touch routing line extends in the first direction in the display area to electrically connect to the first pad, and the first touch routing line is disposed in a third metal layer different than the first metal layer and the second metal layer,
wherein the third metal layer is disposed between the encapsulation layer and the first touch interlayer insulation film,
wherein the second metal layer is disposed between the first touch interlayer insulation film and the second touch interlayer insulation film, and
wherein the first metal layer is disposed between the second touch interlayer insulation film and the touch protective film.

9. The display device of claim 8, further comprising a touch buffer film disposed between the encapsulation layer and the first touch interlayer insulation film.

10. The display device of claim 8, wherein the second touch interlayer insulation film includes an organic film.

11. The display device of claim 8, wherein the first touch interlayer insulation film includes an inorganic film or an organic film.

* * * * *